United States Patent [19]

Takahashi et al.

[11] Patent Number: 4,613,908

[45] Date of Patent: Sep. 23, 1986

[54] DIGITAL VIDEO SIGNAL REPRODUCING APPARATUS

[75] Inventors: Nobuaki Takahashi, Yamato; Seiichi Takashima, Ayase; Takeshi Shibamoto, Sagamihara; Koji Tanaka, Tokyo; Fujio Suzuki, Machida; Mitsuo Kubo, Yamato; Mitsuru Kikuchi, Yokohama; Hiroyuki Sugiyama, Isehara; Yoshiaki Amano, Fujisawa, all of Japan

[73] Assignee: Victor Company of Japan, Ltd., Yokohama, Japan

[21] Appl. No.: 523,770

[22] Filed: Aug. 16, 1983

Related U.S. Application Data

[62] Division of Ser. No. 485,054, Apr. 14, 1983, Pat. No. 4,520,401.

[51] Int. Cl.[4] .............................................. H04N 5/76
[52] U.S. Cl. .................................. 358/310; 358/335; 360/8; 360/9.1; 360/32; 360/331; 360/48; 360/49; 360/50; 360/72.2
[58] Field of Search ..................... 358/310, 335; 360/8, 360/9.1, 32, 33.1, 39, 72.1, 72.2, 48, 49, 50

[56] References Cited

U.S. PATENT DOCUMENTS

| | | | |
|---|---|---|---|
| 4,280,147 | 7/1981 | Baldwin | 360/10 |
| 4,321,632 | 3/1982 | Leis | 360/89 |
| 4,463,387 | 7/1984 | Hashimoto | 360/32 X |
| 4,492,989 | 1/1985 | Watanabe et al. | 360/32 |

FOREIGN PATENT DOCUMENTS

| | | |
|---|---|---|
| 0044073 | 1/1982 | European Pat. Off. |
| WO81/03098 | 10/1981 | Int'l Pat. Institute . |
| 1550267 | 8/1979 | United Kingdom . |
| 2060311 | 4/1981 | United Kingdom . |
| 2075792 | 11/1981 | United Kingdom . |
| 2119199 | 11/1983 | United Kingdom . |
| 2122047 | 1/1984 | United Kingdom . |
| 2130454 | 5/1984 | United Kingdom . |
| 2132848 | 7/1984 | United Kingdom . |

OTHER PUBLICATIONS

SMPTE Journal, Sep. 1980, vol. 89, pp. 658–662.

Primary Examiner—Robert L. Richardson
Attorney, Agent, or Firm—Michael N. Meller

[57] ABSTRACT

A digital video signal reproducing apparatus comprises a reproducing circuit for reproducing a digital video signal from a recording medium, where the recording medium is time-sequentially recorded with the digital video signal having a signal format in which a header signal is added to each of divided picture element data groups which are obtained by dividing a picture element data group in terms of a predetermined unit, the picture element data group is obtained by subjecting an analog video signal to a digital pulse modulation at a sampling frequency such that a product of a number of picture element data in one scanning line and an effective number of scanning lines in one picture of a standard television system is exceedingly close to $2^{18}$ but less than $2^{18}$, and the header signal at least comprises a synchronizing signal and a picture mode identification code, a header signal reproducing circuit for discriminating the header signal within the digital video signal reproduced by the reproducing circuit and reproducing the header signal, two memory circuits into which the picture element data group within said reproduced digital video signal is written and from which a stored picture element data group is read out, a circuit for controlling write-in and read-out with respect to the two memory circuits according to a code in the reproduced header signal, and a circuit for producing an analog video signal in accordance with a standard television system from the picture element data read out from the two memory circuits.

16 Claims, 27 Drawing Figures

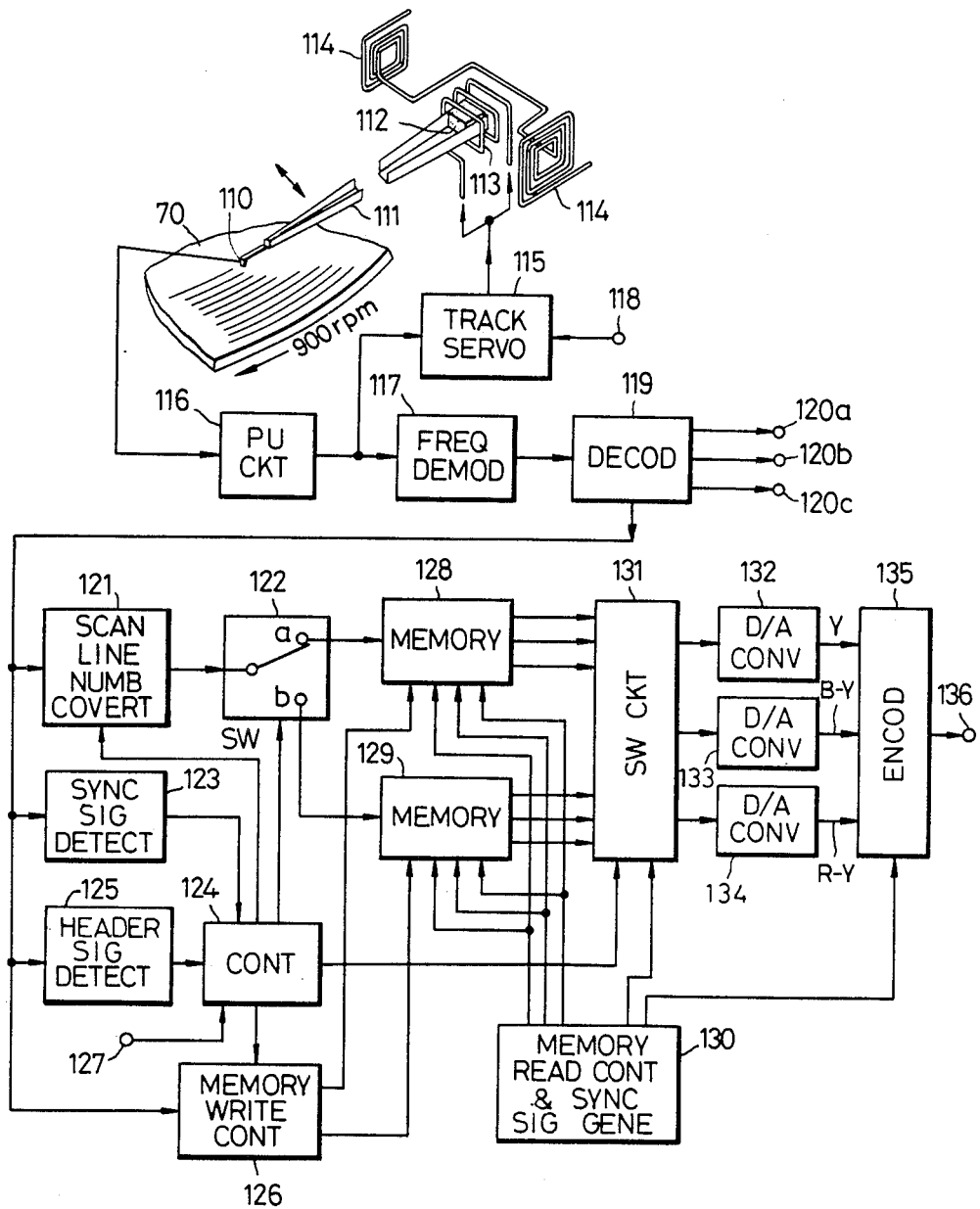

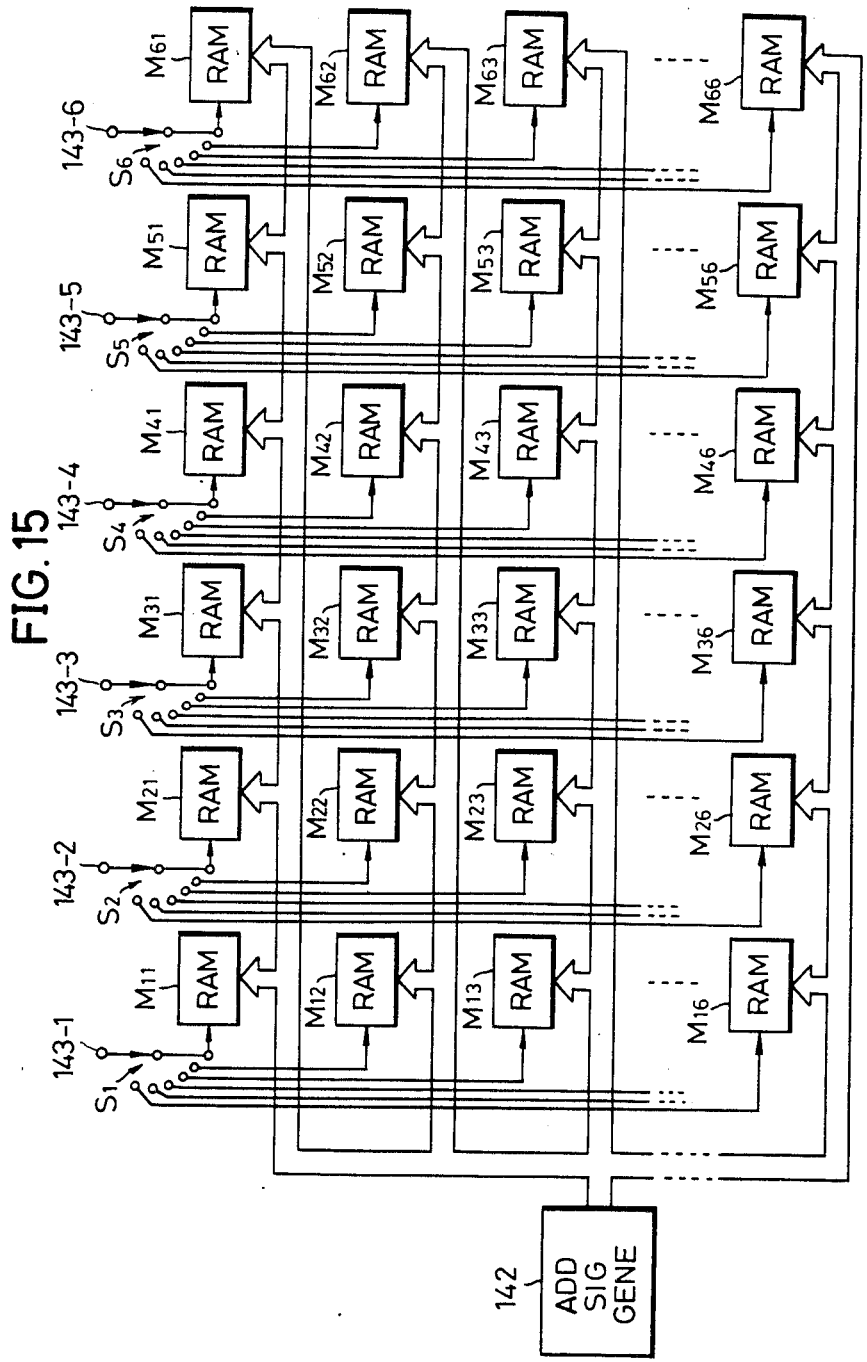

DIGITAL VIDEO SIGNAL REPRODUCING APPARATUS

The present application is a divisional application of the U.S. patent application Ser. No. 485,054 filed Apr. 14, 1983, and now issued as U.S. Pat. No. 4,520,401.

BACKGROUND OF THE INVENTION

The present invention generally relates to digital video signal reproducing apparatuses, and more particularly to a reproducing apparatus for reproducing a digital video signal from a recording medium to obtain the original analog video signal, where the digital video signal which is time-sequentially recorded on the recording medium has a signal format in which picture element data groups obtained by subjecting the analog video signal to digital pulse modulation are divided in terms of predetermined units, and a header signal at least comprising a synchronizing signal and a picture mode identification code is added to each of the divided picture element data groups.

Recently, systems which record a digital video signal obtained by subjecting video and audio signals to digital pulse modulation such as pulse code modulation (PCM) and a digital audio signal onto a rotary recording medium (hereinafter simply referred to as a disc) as variations in geometrical configuration, and reproduce the recorded signal as variations in the intensity of light reflected from the disc or variations in electrostatic capacitance, have been developed and realized. Further, recording systems have been proposed for digital audio discs, according to which a digital video signal comprising color still picture information is added to a digital audio signal and recorded together on the same track on the disc. Generally, a plurality of music programs are recorded on the same side of such a digital audio disc, and the digital video signal comprising the color still picture information is recorded in correspondence with each of the recorded music programs. When reproducing such a digital audio disc, the music programs on the disc can be reproduced by a reproducing system which is common throughout the world. However, the television systems are not common throughout the world, and there roughly exist three kinds of television systems. Accordingly, in order to enable reproduction of the video signal recorded on the disc even if the television system employed in a region or country is different from the television system of the recorded video signal, it is first necessary to convert the recorded video signal into a signal format in accordance with the television system of the reproducing apparatus used in that region or country before obtaining a reproduced picture. The information content of the above digital video signal relates to a color still picture which helps the listener's imagination when he listens to the reproduced sounds of the digital audio signal. Hence, it is desirable to reproduce the digital video signal from the disc in the signal formats which are in accordance with each of the television systems, regardless of the differences in the television systems throughout the world.

The color television systems throughout the world can roughly be divided into three systems, that is, NTSC, PAL, and SECAM systems, according to the transmission formats of the chrominance signal. In each of these color television systems, the color video signal is constituted by a luminance signal and two kinds of color difference signals. Hence, it is desirable to employ a component coding system which transmits the color video signal by independently subjecting the luminance signal and the two kinds of color difference signals to digital pulse modulation, in order to facilitate compatibility between the three systems. Moreover, it is desirable to employ the component coding system in view of the fine picture quality which may be obtained by use of a display monitor having input terminals for the three primary colors of red (R), green (G), and blue (B) which will probably be realized in the future, and especially because partial moving pictures may be recorded on the digital audio discs, and the like.

Among the digital video signals which are subjected to the component coding, the CCIR is presently studying standardization of the standards especially with respect to digital video signals which are used in television broadcasting studios. Regarding the (number of scanning lines)/(number of pictures per second) or the horizontal scanning frequency, the major systems throughout the world either belong to the system with (525 lines)/(30 pictures) or (625 lines)/(25 pictures). Hence, a component coding system is proposed to the CCIR, in which the sampling frequency of the luminance signal is set to 13.5 MHz which is a frequency equal to six times the frequency of 2.25 MHz which is a least common multiple of the horizontal scanning frequencies of the two major systems, the two kinds of color difference signals (R−Y) and (B−Y) are respectively sampled at a frequency of 6.75 MHz, and the signals are respectively quantized at a rate of 8 bits/pel. In this case, the number of sampling points of the luminance signal on one scanning line (hereinafter simply referred to as a line), is obtained by dividing the sampling frequency of 13.5 MHz by the horizontal scanning frequency of 15.625 kHz, and is equal to 864. In addition, the proposed signal format is a format which introduces no degradation in the signal even with respect to picture processing such as chromaky processing.

It is also desirable to transmit the digital video signal for home use according to the above proposed standard, however, the capacity of the picture memory element becomes large when the number of data is large, and there will be a problem in that the transmitting time of the picture becomes long. If the number of effective sampling points on one line is 720 for the luminance signal and respectively 360 for the two kinds of color difference signals (R−Y) and (B−Y) and the number of transmitting lines is 575, for example, the number of transmitted sampling points becomes $(720 + 2 \times 360) \times 575 = 828,000$. Moreover, if one sampling point is described by eight bits, the number of bits of the transmitted sampling points becomes $828,000 \times 8 = 6,624,000$. This is an information quantity which may be stored by use of 102 64k-RAMs (random access memories) having $2^{16}$ (=65,536) bits. If such an information quantity is transmitted by use of a transmission path capable of transmitting sixteen bits at the frequency of 44.1 kHz, the required transmission time is equal to $6,624,000/(44,100 \times 16) = 9.39$ seconds. Further, if it is assumed that the memory circuit comprises two kinds of memories, that is, memory for write-in and memory for display, a total of 204 64k-RAMs become necessary. However, when transmitting the digital video signal for home use in the digital audio disc, this will make the construction of the memory circuit within the reproducing apparatus complex, and the cost of the reproducing apparatus will become high. Such complexity of the memory circuit and increased cost of the reproducing apparatus are highly undesirable in digital video signal reproducing apparatuses for home use where there is a demand for low cost.

On the other hand, the present inventors have devised a digital signal recording system disclosed in a Japanese Patent Application No. 56-139567. According to this devised system, one frame (or one field) of the video signal related to the color still picture information comprises the luminance signal and the two color difference signals (B−Y) and (R−Y), and three kinds of digital video signals are obtained by independently subjecting the luminance signal and the two color difference signals to digital pulse modulation. The three kinds of digital video signals are successively and time sequentially transmitted, and this devised system is in accordance with the component coding system.

However, according to this devised digital signal recording system, one frame (or one field) of the digital luminance signal is recorded, one frame (or one field) of the first digital color difference signal is recorded thereafter, and one frame (or one field) of the second digital color difference signal is recorded after the first digital color difference signal. Hence, if the operator attempts to change the still picture being displayed when reproducing a disc recorded according to such a recording system, the two kinds of color information will successively change in terms of one picture after the luminance information of the still picture of one picture changes. As a result, there was a disadvantage in that the reproduced picture was irregular and unpleasant to watch.

Accordingly, the present inventors have devised another recording system disclosed in Japanese Patent Applications No. 57-51925 through No. 57-51928. When recording the digital video signal onto the disc according to this devised system, the digital luminance signal and the two kinds of digital color difference signals are respectively transmitted alternately in terms of information corresponding to several lines or less. Moreover, a discrimination signal or header signal for enabling the reproducing apparatus to automatically discriminate the information content of the digital video signal and the like, is recorded at the beginning and end of the digital video signal corresponding to one frame or one field of the digital video signal transmitted with such a signal format. However, according to this devised system, if the digital video signal is reproduced from an intermediate point thereof due to an operation such as random access, it becomes impossible to read out from the memory circuit and the display of the read-out signal thus cannot be carried out for an interval until the subsequent digital video signal is reproduced. Furthermore, there was a problem in that it was impossible to partially modify the picture and carry out reproduction of a partially moving picture.

SUMMARY OF THE INVENTION

Accordingly, it is a general object of the present invention to provide a novel and useful digital video signal reproducing apparatus in which the above described problems have been overcome.

Another and more specific object of the present invention is to provide digital video signal reproducing apparatus for reproducing a digital video signal from a recording medium, where the digital video signal which is time-sequentially recorded on the recording medium has a signal format in which a digital luminance signal and digital color difference signals are respectively divided into picture element data groups where one picture element data group comprises a specific number of adjacent rows or a specific number of adjacent columns in a picture, and a header signal or discrimination signal is added to beginnings of each of the divided picture element data groups comprising the digital luminance signal and the two kinds of digital color difference signals. According to the apparatus of the present invention, even if the digital video signal is reproduced from an intermediate point thereof, the digital video signal subsequent to the first header signal which is reproduced from the intermediate point is written into a memory circuit within the reproducing apparatus, and a picture corresponding to the reproduced digital video signal can be displayed. Further, even if the transmitted word is shifted timewise due to some cause, the error introduced because of the time shift can be reduced.

Still another object of the present invention is to provide a digital video signal reproducing apparatus for reproducing a digital video signal from a recording medium, where the header signal recorded on the recording medium is constituted by at least a synchronizing signal, a picture mode identification code, a picture information quantity identification code, and a code for identifying a write-in address number in the memory circuit within the reproducing apparatus. According to the present invention, even if it is discriminated from the picture mode identification code that the digital video signal relates to a color picture of 625 scanning lines, 525 scanning lines, a color picture of a number of scanning lines (1125 scanning lines, for example) providing high definition, or a moving picture in accordance with a run-length code, the format with which the digital video signal is written into the memory circuit can be selected to provide the most suitable write-in and display of the signal. In addition, according to the discrimination of the picture information quantity identification code on whether the reproduced digital video signal corresponds to one frame or one field of the video signal, the write-in with respect to the memory circuit can be carried out most suitably even if the signal formats (that is, the number of words) of the digital video signal corresponding to one frame or the digital video signal corresponding to one field are different. Moreover, it is possible to carry out modification of a part of the reproduced picture and display of a partially moving picture, and further, the effect due to dropout is small.

Another object of the present invention is to provide a digital video signal reproducing apparatus for reproducing a component coded digital video signal from a recording medium, where the component coded digital video signal is time-sequentially multiplexed therein with a first picture element data group obtained by subjecting the analog luminance signal to digital pulse modulation at a first sampling frequency which is exceedingly close but not over $2^{18}$, where $2^{18}$ is the product obtained by multiplying the number of picture elements of the digital luminance signal on one scanning line and the effective number of scanning lines (octive scanning lines per frame) in one picture of the standard television system, and second and third picture element data groups obtained by independently subjecting the two kinds of analog color difference signals to digital pulse modulation at a second sampling frequency which is lower than the first sampling frequency. According to the reproducing apparatus of the present invention, a generally marketed 64k-RAM can be efficiently used to realize the memory circuit for storing the reproduced digital video signal provided within the reproducing apparatus which reproduces the signals from the rotary recording medium, that is, the memory circuit can be realized by a least possible number of 64k-RAMs. Thus, an address circuit can be provided in common with respect to the least possible number of 64k-RAMs, and as a result, the circuit construction of the reproducing apparatus becomes simple and the cost of the reproducing can be reduced. In addition, if the sampling frequency of the digital luminance signal is set to 9 MHz and the sampling frequency of the two kinds of digital color difference signals are set to 2.25 MHz, the digital video signal can be reproduced satisfactorily by effectively using the transmission band of the generally marketed television receiver. Furthermore, the sampling frequency of 9 MHz of the digital luminance signal is in a simple relationship with the sampling frequency of 13.5 MHz used in the television broadcasting studios, that is, 2:3 which is a simple ratio of integers exist between the two sampling frequencies. Therefore, processing such as recording and reproduction of the digital video signal can be carried out by a digital video recorder and other peripheral devices, and it is possible to make a master tape in accordance with the system of the present invention by thereafter converting the sampling frequency.

Still another object of the present invention is to provide a digital video signal reproducing apparatus having a memory circuit, in which a code error in a digital video signal reproduced from a recording medium on which the digital video signal is time-sequentially multiplexed and recorded together with at least an error code detection signal, an error correction signal, and a synchronizing signal, is corrected and the digital video signal is restored before being stored in the memory circuit, so that a digital video signal substantially having no degradation in the picture quality caused by the code error upon transmission of the digital video signal can be read out from the memory circuit.

Another object of the present invention is to provide a digital video signal reproducing apparatus having a memory circuit, in which N (N is an integer) stages of memory elements having a capacity in the range of $2^{17}$ bits for one field and for storing the luminance signal, and N or less stages of memory elements having a capacity in the range of $2^K$ (where K is equal to 16, 15, or 14) bits for one field and for storing the chrominance signal, are arranged so that the component coded digital video signal is selectively supplied to the memory elements for storing the luminance signal and the memory elements for storing the chrominance signal through an input switch. According to the reproducing apparatus of the present invention, it is possible to efficiently store the component coded digital video signal into the memory circuit so that unused memory space with respect to the total memory capacity is small, by independently storing the luminance signal and the chrominance signal of the digital video signal.

Moreover, the basic construction of the memory circuit does not change regardless of the selection of the quantization number of each of the picture element data from any one of five to eight bits, and the picture element data can constantly be stored into a plurality of random access memories (RAMs) with high efficiency, and further, the same memory address can be supplied with respect to all the RAMs. Thus, the write-in and read-out with respect to a frame memory can be carried out with a least number of address counters, and the exceedingly small unused memory space may be reserved as a supplementary memory for converting the number of scanning lines. In this case, there substantially is no unused memory space in the memory circuit, and the utilization efficiency of the memory is extremely high. Hence, the present invention is especially suited for application in reproducing apparatuses for home use where there is a demand for low cost.

Another object of the present invention is to provide a digital video signal reproducing apparatus for reproducing a digital video signal from a recording medium, where the header signal recorded onto the recording medium together with the picture element data includes a picture category or sort identification code for identifying that the picture category is one among a plurality of picture categories of mutually different picture information. According to the present invention, it is possible to reproduce only the picture information of a desired picture category from among the plurality of picture information having mutually different picture categories.

Still another object of the present invention is to provide a digital video signal reproducing apparatus for reproducing a digital video signal from a recording medium, where a read-out specifying signal and a signal transmission termination signal are added to the digital video signal with a timing matched with the picture display of the digital, video signal and recorded on the recording medium in continuance with the digital video signal constituted by the picture element data groups corresponding to one picture, so that the display is switched to the reproduced picture of the above digital video signal with a timing in accordance with the reproduced timing of the signal transmission termination signal. According to the present invention, it is possible to detect the signal transmission termination signal and switch the display to the reproduced picture of the digital video signal added with the detected signal transmission termination signal from the reproduced picture displayed up to that point in time. Moreover, in a case where a recording medium which is time-sequentially recorded with the component coded digital video signal, signal transmission termination signal, synchronizing signal, and the above described codes together with the digital audio signal is reproduced, the display of the color reproduced picture can be switched in relation to the audio information of the reproduced digital audio signal and with a timing in accordance with the reproduced timing of the signal transmission termination signal. Accordingly, it is possible to switch the display of the color picture (especially still picture) with an extremely high accuracy at a position such as a discontinuity or interruption in the reproduced sound.

A further object of the present invention is to provide a digital video signal reproducing apparatus for reproducing a digital video signal from a recording medium, where the header signal recorded onto the recording medium together with the picture element data groups further includes a write-in specifying code for specifying the memory circuit into which the divided picture element data groups are to be stored between the two memory circuits within the reproducing apparatus. According to the present invention, it is possible to instantaneously switch the display to the picture obtained by the picture element data stored in the non-displaying memory circuit from the picture obtained by the picture element data stored in the displaying memory circuit, and further, the divided picture element data groups can be written into the displaying memory circuit from which the picture element data of the picture being displayed is read out and these divided picture element data groups which are written into the displaying memory circuit can then be read out. Hence, according to the present invention, it is possible to switch a part of the picture being displayed, and display partially moving picture.

Another object of the present invention is to provide a digital video signal reproducing apparatus in which the header signal includes a picture transmission identification code for identifying whether the divided picture element data groups are transmitted as a part of the picture element data groups constituting one picture, or transmitted as a part of the picture element data groups of a part of the picture. According to the present invention, even in a case where the synchronizing signal within the header signal is not detected due to dropout and the like, degradation in the picture quality of the reproduced color still picture is prevented upon transmission of the picture in full. In addition, even if the picture transmission identification code cannot be detected, the divided picture element data groups can be written according to the value of the picture transmission identification code detected immediately prior thereto, to minimize the effect on the reproduced picture.

Still another object of the present invention is to provide a digital video signal reproducing apparatus in which picture element data of a second digital video signal having an information quantity corresponding to less than one picture for giving movement to the picture being displayed, are written into the displaying memory circuit, and the picture element data of a first digital video signal corresponding to one picture which are divided and reproduced by use of a transmission period in which the second digital video signal does not exist, are written into the non-displaying memory circuit. In the present invention, the non-displaying memory circuit is switched and operated as a displaying memory circuit after the write-in of picture element data corresponding to one picture into the non-displaying memory circuit is completed. According to the present invention, the display can be switched to another still picture obtained by the first digital video signal, without interrupting the movement in the partially moving picture obtained by the second digital video signal.

A further object of the present invention is to provide a digital video signal reproducing apparatus in which a header signal reproducing circuit stops its operation to detect the synchronizing signal with respect to an input reproduced signal during a transmission period of a specific number of words immediately after the synchronizing signal within the header signal is detected. According to the reproducing apparatus of the present invention, it is possible to prevent the codes and the picture element data other than the synchronizing signal within the header signal from being erroneously detected as the synchronizing signal.

Another object of the present invention is to provide a digital video signal reproducing apparatus having a memory circuit, in which a total of eight to five picture element data comprising picture element data of four sampling points in the digital luminance signal and picture element data of two or less of each of the digital color difference signals are considered as one unit, and the component coded digital video signal having the signal format such that the digital video signal is transmitted in terms of this unit is stored into the memory circuit so that all of the picture element data in this one unit are stored in the same address of the memory circuit and the address at which the picture element data in one unit are store is changed for every unit. According to the reproducing apparatus of the present invention, it is easy to control the addresses in the memory circuit.

Other objects and further features of the present invention will be apparent from the following detailed description when read in conjunction with the accompanying drawings.

BRIEF DESCRIPTION OF THE DRAWINGS

FIG. 13 is a systematic block diagram showing an embodiment of a digital video signal reproducing apparatus according to the present invention;

FIG. 15 is a systematic block diagram showing an example of a constitution of memories and the like within the block system shown in FIG. 13;

DETAILED DESCRIPTION

Figure 1:
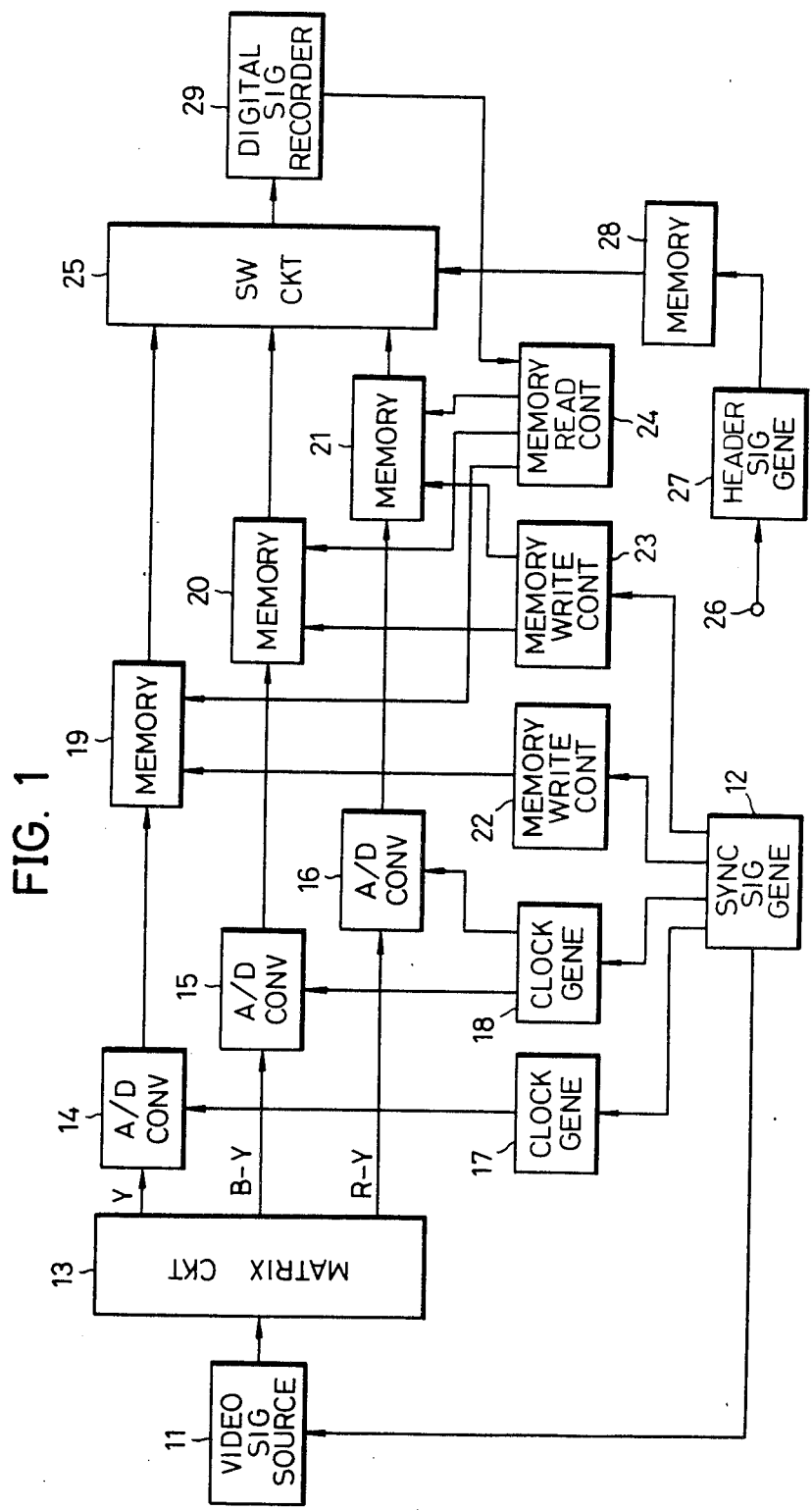
FIG. 1 is a systematic block diagram showing an essential part of an example of a digital video signal recording system.

First, description will be given with respect to selection of sampling frequencies of a digital luminance signal and two kinds of color difference signals which are to be reproduced by the reproducing apparatus according to the present invention, and selection of effective number of scanning lines. In the existing television broadcasting signal, the frequency band of the luminance signal is 4.2 MHz in the NTSC system, and 5 MHz or 6 MHz in the PAL system and the SECAM system. However, the frequency band of the luminance signal which is actually transmitted in the television receiver is only up to a range of 3 MHz in the NTSC system and 3 MHz to 4 MHz in the PAL system and the SECAM system. Accordingly, it is possible to lower the sampling frequency to a range of 8 MHz, however, it is better to have some margin. Hence, the sampling frequency of the luminance signal is selected to 9 MHz which has a 2:3 relationship with the sampling frequency of 13.5 MHz according to standard proposed at the CCIR described before. In addition, the sampling frequencies of the color difference signals (R−Y) and (B−Y) are respectively selected to 2.25 MHz which is ¼ the above sampling frequency of 9 MHz of the luminance signal.

The number of bits required in a memory circuit for storing a digital video signal increases proportionally to the frequency band of the signal. Accordingly, by considering a case where a digital video signal of a high definitional mode using 1125 scanning lines and 20 MHz as the frequency band of the luminance signal which may be employed in the future, in addition to the digital video signal of the standard mode using 625 or 525 scanning lines, the recording is carried out by providing a picture mode identification code within a header signal which will be described hereinafter, for identifying whether the mode is the standard mode or the high definitional mode.

The number of sampling points of the luminance signal in one scanning line of the digital video signal of the standard mode, can be obtained by dividing the sampling frequency of 9 MHz by the horizontal scanning frequency of 15.625 kHz, and is 576. However, horizontal blanking periods such as the horizontal synchronizing signal interval and the color burst signal interval are included within these 576 sampling points besides the picture information, and if the sampling points of these horizontal blanking periods are excluded, the number of sampling points can be reduced to a number in the range of 456.

On the other hand, the number of bits in the generally marketed 64k-RAM is $2^{16}$ (=65,536). Hence, if four of such 64k-RAMs are used, $4 \times 2^{16} = 2^{18} = 262,144$ bits can be obtained. If this number of bits obtained by use of four 64k-RAMs, that is, 262,144 is divided by 456 which is the effective number of sampling points of the luminance signal, the quotient becomes equal to 574.87. Therefore, if the effective number of scanning lines (octive scanning lines per frame) which is transmitted as picture among the 625 scanning lines in one frame, is selected to 572 which is exceedingly close to the above quotient 574.87 but less than 574.87, each of the picture element data of the effective sampling points of the luminance signal corresponding to one frame can be efficiently stored into four 64k-RAMs.

In addition, the information quantity of two kinds of digital color difference signals obtained by independently subjecting the two kinds of color difference signals (R−Y) and (B−Y) to digital pulse modulation at the sampling frequency of 2.25 MHz, is ¼ the information quantity of the above digital luminance signal. Thus, the picture element data of the effective sampling points of the two digital color difference signals can respectively be stored efficiently into one 64k-RAM. Accordingly, if it is assumed that the quantization number of the picture element data of one sampling point is six bits, one frame of the digital video signal in which the digital luminance signal and the two kinds of color difference signals are time-sequentially multiplexed can be stored into 36 64k-RAMs from an equation $6 \times (4+1+1) = 36$. Further, a digital video signal corresponding to two fields can be stored into 36 64k-RAMs, which is substantially less than the case of the memory circuit for the television broadcasting studio where 204 64k-RAMs are necessary, and the cost can be reduced significantly.

In the case of component coding, it has been experimentally confirmed that even if the picture element data of one sampling point is quantized by a quantization number of six bits, the effect of quantization noise on the picture does not introduce problems in the general reproducing apparatus for home use. Moreover, in the present embodiment of the invention, the number of memory chips (memory circuits) required for storing the picture element data is a least possible number, and an address signal generating circuit for controlling the actual storing of the digital video signal into the memory circuits can be used in common with respect to the least possible number of memory circuits. As a result, the memory control can be carried out with ease, and it is unnecessary to provide additional buffer memory elements because of the facilitated memory control.

Next, description will be given with respect to the recording system for recording the digital video signal onto a recording medium, by referring to FIG. 1. A video signal source 11, such as a color television camera, flying spot scanner, video tape recorder (VTR), and the like, is supplied with a television synchronizing signal from a television synchronizing signal generator 12 according to the needs, and produces and supplies three primary color signals related to a color still picture which is to be recorded to a matrix circuit 13. The matrix circuit 13 forms a luminance signal Y and color difference signals (B−Y) and (R−Y) with 625 scanning lines and a horizontal scanning frequency of 15.625 kHz, and independently supplies these signals to analogto-digital (A/D) converters 14, 15, and 16. On the other hand, the output television synchronizing signal of the television synchronizing signal generator 12 is supplied to clock generators 17 and 18 and memory write controllers 22 and 23.

The A/D converter 14 samples the luminance signal Y which is in the range of 5 MHz with a sampling frequency of 9 MHz for the reason described before, according to a clock signal of 9 MHz obtained from the clock generator 17, and thereafter converts the luminance signal into a digital luminance signal by quantization with a quantization number of eight bits. The digital luminance signal thus obtained from the A/D converter 14 is supplied to a memory 19. The A/D converter 15 samples one color difference signal (B−Y) from among the color difference signals (B−Y) and (R−Y) having bands which are fractions of the band of the luminance signal by considering the known visual characteristics of man, with a sampling frequency of 2.25 MHz as described before, according to a clock signal of 2.25 MHz obtained from the clock generator 18, and thereafter converts the color difference signal into a digital color difference signal by quantization with a quantization number of eight bits. This digital color difference signal is supplied to a memory 20. Further, the A/D converter 15 similarly samples the other color difference signal (R−Y) with a sampling frequency of 2.25 MHz according to a clock signal from the clock generator 18, thereafter converts the color difference signal into a digital color difference signal, and supplies this digital color difference signal to a memory 21.

Figure 2:
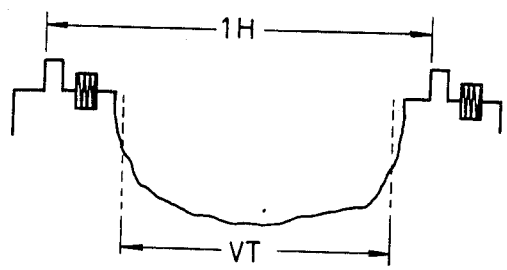
FIG. 2 shows a transmission period of a video signal of a video information which is recorded.

One frame of the above digital luminance signal is written into the memory 19 according to output pulses of the memory write controller 22, and read-out from the memory 19 is successively carried out according to output pulses of a memory read controller 24. The digital luminance signal supplied to the memory 19 is a digital luminance signal with 456 sampling points for one scanning line, that is, 456 picture elements in the horizontal direction. If a luminance signal with 625 scanning lines and a horizontal scanning frequency of 15.625 kHz is sampled at a sampling frequency of 9 MHz, the number of sampling points in one scanning line becomes 576 as described before. However, in the video signal shown in terms of horizontal scanning periods in FIG. 2, a video interval VT actually including the video information is in the range of approximately 80% of one horizontal scanning period (1H). On the other hand, the horizontal and vertical synchronizing signals and the color burst signal may be added in the reproducing apparatus. Accordingly, the digital luminance signal with the 456 sampling points within the video interval VT is supplied to the memory 19. In addition, the digital luminance signal read out from the memory 19 is a digital luminance signal related to 572 scanning lines including the picture information among the 625 scanning lines for the reason described before. Moreover, for the reasons which will be explained hereinafter, it is assumed that the digital luminance signal is read out with a sampling frequency of 88.2 kHz (or 94.5 kHz) and a quantization number of eight bits.

One frame of the digital color difference signals are written into the respective memories 20 and 21, according to a write-in control signal from the memory write controller 23. The data stored in the memories 20 and 21 are respectively read out according to the output pulses of the memory read controller 24. The digital color difference signals supplied to the memories 20 and 21 have a sampling frequency of 2.25 MHz which is ¼ the sampling frequency of the digital luminance signal, and are digital signals with 114 (=456/4) sampling points in one scanning line. The digital color difference signals are read out as digital signals with a sampling frequency of 44.1 kHz (or 47.25 kHz) and a quantization number of eight bits for one picture element. In addition, the first and second color difference signals read out from the memories 20 and 21 also relate to picture information of 572 scanning lines, similarly as in the case of the digital luminance signal.

The digital luminance signal with the sampling frequency of 88.2 kHz (or 94.5 kHz) and the quantization number of eight bits which is read out from the memory 19, the first digital color difference signal with the sampling frequency of 44.1 kHz (or 47.25 kHz) and the quantization number of eight bits for one picture element which is read out from the memory 20, and the second digital color difference signal with the sampling frequency of 44.1 kHz (or 47.25 kHz) and the quantization number of eight bits for one picture element which is read out from the memory 21, are respectively supplied to a switching circuit 25.

On the other hand, signals such as a signal generated every time the still picture signal to be recorded is changed, are applied to an input terminal 26, and supplied to a header signal (identification signal) generator 27 which will be described hereinafter. The header signal generator 27 generates a header signal having a signal format shown in FIG. 5, and supplies the generated header signal to a memory 28. For example, the memory 28 reads out the header signal with a period corresponding to the transmission period of 684 words, with a sampling frequency of 44.1 kHz (or 47.25 kHz) and a quantization number of sixteen bits, and supplies the read out header signal to the switching circuit 25.

Figure 4:
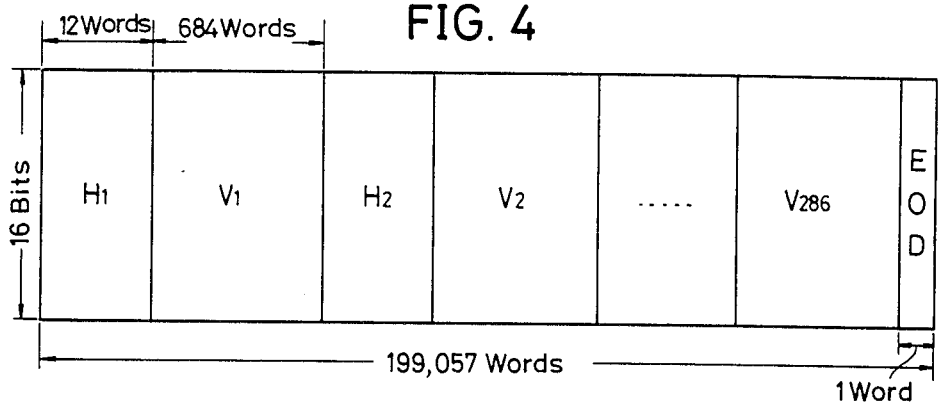
FIG. 4 shows an embodiment of a signal format of a digital video signal reproduced by the reproducing apparatus according to the present invention.
Figure 5:
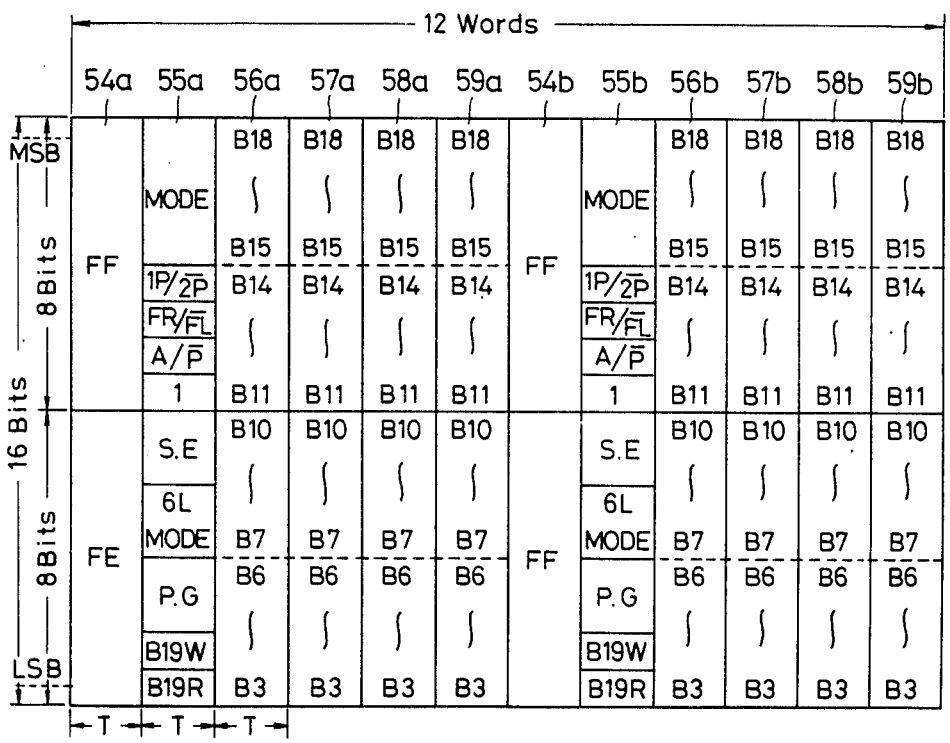
FIG. 5 shows an embodiment of a signal format of the header signal reproduced by the reproducing apparatus according to the present invention.
Figure 6:
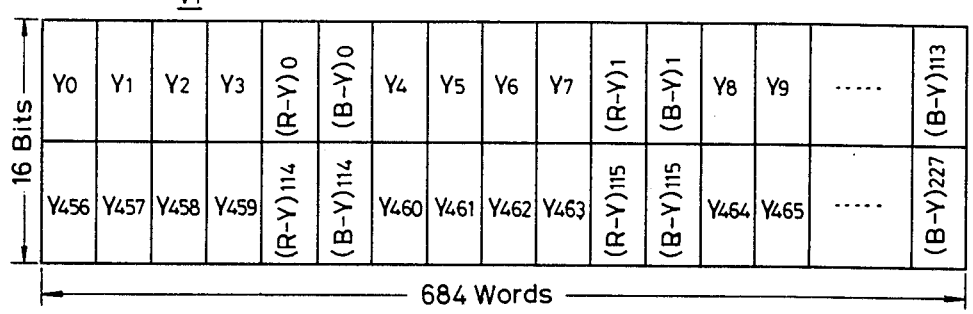
FIG. 6 shows an embodiment of a signal format of one divided picture element data group within the digital video signal shown in FIG. 4.

The switching circuit 25 switches each of the digital signals from the memories 19, 20, 21, and 28 with a predetermined sequence, and generates a digital video signal having a signal format shown in FIGS. 4 through 6. The digital video signal generated by the switching circuit 25 is supplied to a digital recorder 29 wherein the digital video signal is recorded onto a magnetic tape, for example. A read-out control signal is produced from the memory read controller 24 in synchronism with a clock signal from the digital recorder 29.

Figure 3:
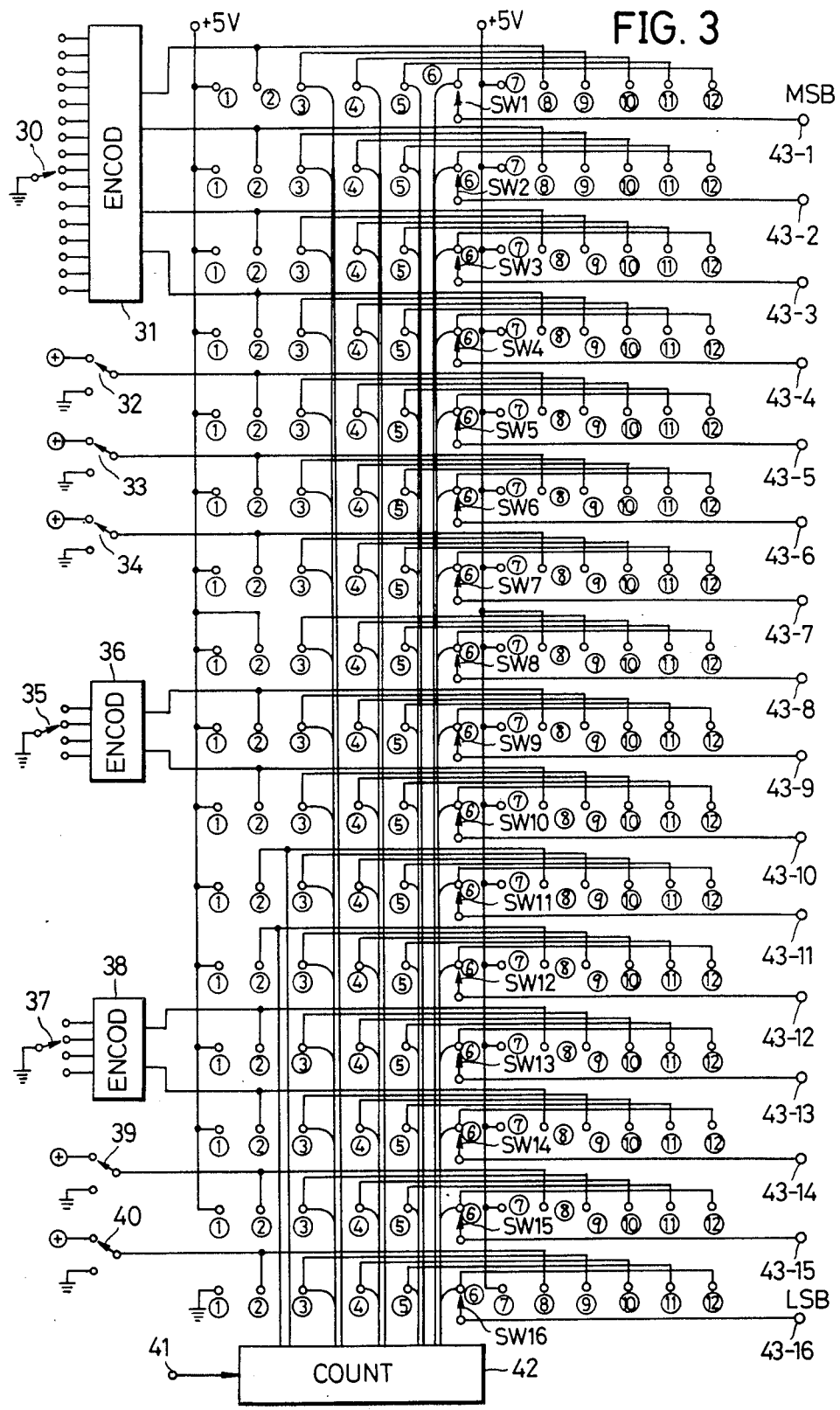
FIG. 3 is a systematic block diagram showing an example of a header signal generator within the block system shown in FIG. 1.

FIG. 3 shows an example of the constitution of the header signal generator 27. In FIG. 3, ganged switches $SW_1$ through $SW_{16}$ respectively have twelve contacts, and are successively switched from respective contacts ① to contacts on the right side in FIG. 3. After the ganged switches $SW_1$ through $SW_{16}$ are respectively switched and connected to respective contacts ⑫, the ganged switches $SW_1$ through $SW_{16}$ become connected to the respective contacts ①. A mode setting switch 30 comprises sixteen contacts, and is switched according to the picture mode of the digital video signal. A 4-bit signal in accordance with the connection state of the mode setting switch 30 is produced from an encoder 31, and supplied to respective contacts ② and ⑧ of the switches $SW_1$ through $SW_4$. In addition, a switch 32 is switched according to which channel or channels among the four transmission channels which will be described hereinafter, are used to transmit the digital video signal. The switch 32 produces a transmission channel identification code "1P2P" through an output terminal 43-5.

A switch 33 is switched according to whether the digital video signal corresponds to one frame or one field. A switch 34 is switched according to whether the digital video signal is displayed in full on the screen or displayed on a part of the screen. Further, a switch 35 is connected to one of four contacts according to the kind of special effect. A 2-bit signal is produced from an encoder 36 according to the connection state of the switch 35, and supplied to respective contacts ② and ⑧ of the switches SW$_9$ and SW$_{10}$. A switch 37 generates a picture category or sort identification code "P.G", and is connected to one of four contacts. Two-bit signals of difference values are produced from an encoder 38 according to the connection state of the switch 37, and supplied to respective contacts ② and ⑧ of the switches SW$_{13}$ and SW$_{14}$.

Switches 39 and 40 respectively generate a write-in specifying code "B19W" and a read-out specifying code "B19R". The output signal of the switches 39 is supplied to respective contacts ② and ⑧ of the switch SW$_{15}$, and the output signal of the switch 40 is supplied to respective contacts ② and ⑧ of the switch SW$_{16}$. Moreover, a clock signal applied to an input terminal 41 is supplied to a counter 42 wherein the clock signal is counted. This counter 42 constitutes an address signal generator, and an output counted value of the counter 42 is supplied to respective contacts ③ through ⑥ and ⑨ through ⑫ of the ganged switches SW$_1$ through SW$_{16}$.

Accordingly, when the ganged switches SW$_1$ through SW$_{16}$ are first connected to their respective contacts ①, a synchronizing signal 54a shown in FIG. 5, which will be described hereinafter, indicating values "FF" and "FE" in hexadecimal by upper and lower eight bits thereof, is produced through output terminals 43-1 through 43-16. When the ganged switches SW$_1$ through SW$_{16}$ are then connected to their respective contacts ②, a second word 55a of the header signal, which will be described hereinafter, is produced in parallel through the output terminals 43-1 through 43-16. Similarly thereafter, at the ganged switches SW$_1$ through SW$_{16}$ are connected to their respective contacts ③, ④, ⑤, ..., and ⑫, 16-bit signals representing third, fourth, fifth, ..., and twelfth words indicated by 56a, 57a, 58a, ..., and 59b in FIG. 5 are successively obtained in parallel through the output terminals 43-1 through 43-16.

Next, detailed description will be given with respect to the signal format of the digital video signal. In the digital video signal obtained from the switching circuit 25, a header part of twelve words and a component coded digital video signal part of 684 words corresponding to 2H, where H indicates one horizontal scanning period, are time-sequentially multiplexed in an alternate manner, for example. Moreover, a signal transmission termination signal (hereinafter also referred to as an end-of-data signal or EOD signal) of one word is added to the terminal part of the digital video signal. When video information corresponding to one frame is to be transmitted, a digital video signal of 199,057 words as shown in FIG. 4 is recorded. Such a digital video signal of 199,057 words comprises 286 header parts consisting of header parts H$_1$ through H$_{286}$, 286 video signal parts (divided picture element data groups) consisting of video signal parts V$_1$ through V$_{286}$, and the end-of-data signal of one word indicated by EOD in FIG. 4. In FIG. 4, illustration of the header parts H$_3$ through H$_{286}$ and the video signal parts V$_1$ through V$_{286}$ are omitted. Accordingly, if one word is transmitted in sixteen bits for one channel within the signal of one block shown in FIG. 10 which will be described hereinafter, the digital video signal corresponding to one frame is transmitted in approximately 4.21 seconds when the sampling frequency is 47.25 kHz and approximately 4.51 seconds when the sampling frequency is 44.1 kHz, because the period of the signal of one block is selected to a value which is a reciprocal of the sampling frequency of the header signal.

An example of the signal format of the header parts H$_1$ through H$_{286}$ is shown in FIG. 5. In FIG. 5, the arrangement of bits is shown along the vertical direction where an uppermost bit in FIG. 5 represents the most significant bit (MSB) and a lowermost bit represents the least significant bit (LSB), and the time is shown along the horizontal direction. T indicates a unit of time corresponding to a reciprocal of the sampling frequency of 44.1 kHz (or 47.25 kHz) and is approximately equal to 22.7 μsec (or 21.2 μsec). The 16-bit data within this time unit T will hereinafter be referred to as one word. The synchronizing signal 54a for indicating the beginning of the header signal is arranged at the first word of the header signal. The upper and lower eight bits of the synchronizing signal 54a are respectively selected to values "FF" and "FE" in hexadecimal. Accordingly, if the synchronizing signal 54a is indicated in decimal, all the upper eight bits of the synchronizing signal 54a become "1" while the lower eight bits of the synchronizing signal 54a become "11111110".

The values "FF" and "FE" are only assigned to the upper and lower eight bits of the synchronizing signal 54a within the digital video signal. If the video signal parts V$_1$ through V$_{286}$ assume such values, the values "FF" and "FE" are changed to a value "FD" in the recording system shown in FIG. 1 in advance so as to prevent the video signal parts from being erroneously identified as a synchronizing signal. The value "FF" indicates the brightest picture data of the video signal, however, such picture data indicated by the value "FF" and slightly darker picture data indicated by the value "FE" normally do not exist. Therefore, no problems will be introduced by assigning the values "FF" and "FE" to the synchronizing signal 54a.

Various identification codes are transmitted by the second word 55a of the header signal subsequent to the synchronizing signal 54a. A picture mode identification code "MODE" is arranged at the upper four bits of the second word 55a. This picture mode identification code indicates whether the digital video signal to be recorded relates to a standard still picture (description was given before in conjunction with FIG. 1 by taking an example where the digital video signal to be recorded relates to a standard still picture), a moving picture according to the run-length code, or a high definition still picture, for example. A transmission channel identification code "1P/$\overline{2P}$" is arranged at the fifth bit of the upper eight bits of the second word 55a. This transmission code identification code "1P/$\overline{2P}$" indicates which channel or channels among the four transmission channels which will be described hereinafter are used to transmit the digital video signal. When the value of the code "1P/$\overline{2P}$" is "1", it is identified that the transmission mode is 1P, that is, the fourth channel is used to transmit the digital video signal. In the present embodiment, description is given for the case where the digital video signal is transmitted by use of this fourth channel. On the other hand, when the value of the code "1P/$\overline{2P}$" is "0", it is identified that the transmission mode is 2P, that is, the fourth channel and the third channel are used to transmit the digital video signal. During the transmission mode 2P in which two channels are used to transmit the digital video signal, the digital video signal transmitted by use of the fourth and third channels may relate to mutually different kinds of picture (scenery, portrait, playing scene, and the like, for example). In this case, the viewer may select and enjoy viewing the desired picture between the two choices. In addition, the same picture may be transmitted by use of the fourth and third channels in terms of words, so that it is equivalent to a case where the sampling frequency is doubled.

Next, a picture information quantity identification code "FR/$\overline{FL}$" is arranged at the sixth bit of the upper eight bits of the second word 55a constituting the header signal shown in FIG. 5. This picture information quantity identification code "FR/$\overline{FL}$" indicates whether the digital video signal to be transmitted corresponds to one frame or one field. It is identified that the digital video signal corresponds to one frame when the value of the code "FR/$\overline{FL}$" is "1", and corresponds to one field when the value of the code "FR/$\overline{FL}$" is "0". The signal format of the video signal part which will be described hereinafter differs according to whether the digital video signal is transmitted in terms of frames or in terms of fields. Accordingly, the reproducing apparatus detects the code "FR/$\overline{FL}$" to carry out write-in of the video signal in accordance with the signal format used. Further, a picture transmission identification code "A/$\overline{P}$" is arranged at the seventh bit of the upper eight bits of the second word 55a. When the value of the picture transmission identification code "A/$\overline{P}$" is "1", it is identified that the digital video signal to be transmitted relates to a still picture which should be displayed in full on the screen (so-called full-picture transmission). On the other hand, if the value of the code "A/$\overline{P}$" is "0", it is identified that the digital video signal to be transmitted relates to a picture which should be displayed on a part of the screen by so-called partial re-writing of the digital video signal.

Further, the value "1" indicated at the eighth bit of the upper eight bits of the second word 55a, is a value "1" in binary. If all the first seven bits of the upper eight bits of the second word 55a become "0" and this eighth bit also assumes the value "0", the upper eight bits of the second word in this case may be erroneously detected as the EOD signal shown in FIG. 4 because the upper and lower eight bits of the EOD signal are all selected to "0". For this reason, the value "1" is assigned to the eighth bit of the upper eight bits of the second word 55a.

In addition, in FIG. 5, a 2-bit special effect code "S.E" is arranged at the first and second bits of the lower eight bits of the second word 55a. This special effect code "S.E" is provided to identify the kind of special effect such as fade-in and change of picture from the top or left of the screen applied with respect to the still picture displayed. A scanning line number converting code "6LMODE" is arranged at the two bits subsequent to the above code "S.E". A picture category identification code "P.G" for identifying the category or sort of program is arranged at the two bits subsequent to the scanning line number converting code "6LMODE".

The scanning line number converting code "6LMODE" is a code indicating one of four kinds of mixing ratios required to convert the digital video signal of the system using 625 scanning lines (625-line system) to the digital video signal of the system using 525 scanning lines (525-line system), by converting picture information of six scanning lines to picture information of five scanning lines. That is, when carrying out such conversion of the number of scanning lines, the picture information of the first through fifth scanning lines "1" through "5" of the 525-line system shown in FIG. 8(B) is formed from the picture information of the first through sixth scanning lines "1" through "6" of the 625-line system shown in FIG. 8(A). In order to form the first scanning line (the first 1H of the first field) of the 525-line system, the picture information of the first scanning line (the first 1H of the first field) of the 625-line system is multiplied by $\frac{3}{4}$ and the picture information of the second scanning line (the first 1H of the second field) of the 625-line system is multiplied by $\frac{1}{4}$.

As is well known, the data quantity is reduced to $\frac{1}{2}$ (or multiplied by $\frac{1}{2}$) when the each bit of the digital data is shifted by one bit towards the LSB, and the data quantity is further reduced to $\frac{1}{4}$ (or multiplied by $\frac{1}{4}$) when each bit of the digital data is further shifted by one bit towards the LSB. The above multiplying number $\frac{3}{4}$ is the sum of multiplying numbers $\frac{1}{2}$ and $\frac{1}{4}$. Accordingly, a picture information which is $\frac{3}{4}$ the picture information of the first scanning line of the 625-line system can be obtained, by adding a first digital data obtained by shifting the digital data of the first scanning line of the 625-line system by one bit towards the LSB and a second digital data obtained by shifting the digital data of the first scanning line of the 625-line system by two bits towards the LSB. Hence, it is possible to obtain the picture information of the first scanning line of the 525-line system, by adding the picture information thus obtained which is $\frac{3}{4}$ the picture information of the first scanning line of the 625-line system, and digital data obtained by shifting the digital data of the second scanning line of the 625-line system by two bits towards the LSB.

Similarly, as shown in FIGS. 8(A) and 8(B), the picture information of the second, third, fourth, and fifth scanning lines of the 525-line system can be obtained by mixing the second and third scanning lines, third and fourth scanning lines, fourth and fifth scanning lines, and fifth and sixth scanning lines of the 625-line system at predetermined mixing ratios. As shown in FIGS. 8(A) and 8(B), four kinds of patterns are obtained for forming the picture information of the second through fifth scanning lines of the 525-line system, and these are $(\frac{1}{2}, \frac{1}{2})$, $(\frac{1}{2}, \frac{1}{2})$, $(\frac{1}{4}, \frac{3}{4})$, and (0, 1). Hence, by specifying the mixing ratios with respect to the scanning lines which are to be obtained by the scanning line number converting code "6LMODE", it is possible to easily carry out conversion of the digital signal to the 525-line system from the 625-line system.

When the above code "6LMODE" does not exist, it is necessary to obtain the mixing ratios by an operation such as dividing a number n (n is an integer from 1 to 625) corresponding to the n-th scanning line of the 625-line system by six and obtaining the mixing ratios from the remainder of the quotient.

When the third channel and the fourth channel are used to independently transmit digital video signals, the digital video signal of the normal picture is transmitted by use of the fourth channel, for example, and the special picture in which digital video signals of various kinds of pictures are time-sequentially multiplexed is transmitted by use of the third channel. In such a case, the picture category identification code "P.G" indicates the value of a category number which is assigned with respect to each of the various categories or kinds of pictures (maximum of four categories in the present embodiment) transmitted by use of the third channel. Each of the pictures transmitted by use of the third channel must have continuity when displayed, and are pictures (musical scores, scenery, illustrations, player, and the like, for example) which should not be changed to another picture before their display is completed. Thus, the picture category identification code "P.G" indicates the category number assigned according to the category of the picture. Accordingly, when the viewer selects to reproduce the picture of the third channel and specifies a desired category number, only the picture corresponding to the specified category number is continuously reproduced, and the picture corresponding to that specified category number is prevented from being interrupted by pictures corresponding to other category numbers.

Furthermore, in FIG. 5, 1-bit codes "B19W" and "B19R" respectively are a write-in specifying code and a read-out specifying code with respect to two frame memories within the reproducing apparatus which will be described hereinafter. When the two codes "B19W" and "B19R" respectively are "0" (or "1"), the picture element data of the digital video signal is written into a first (or a second) frame memory within the reproducing apparatus, and the stored data is read out and displayed on the screen. This means that the content of the picture is changed while displaying the picture, and as a result, it is possible to display a moving picture at a part of the still picture being displayed. On the other hand, when the code "B19W" is "0" and the code "B19R" is "1", the picture element data read out from the second frame memory is displayed while the picture element data is written into the first frame memory. In this case, the display on the screen is changed to the display of the picture element data read out from the first frame memory from the display of the picture element data read out from the second frame memory according to the EOD signal, after the write-in with respect to the first frame memory is completed. On the other hand, when the code "B19W" is "1" and the code "B19R" is "0", the picture element data read out from the first frame memory is displayed while the picture element data is written into the second frame memory.

The address signals 56a, 57a, 58a, and 59a are respectively indicated by B3 through B18 in FIG. 5, and are arranged at the third through sixth words of the header signal. These address signals 56a, 57a, 58a, and 59a indicate addresses in the memory circuit for storing the two picture element data corresponding to the upper and lower eight bits of each of the words constituting the video signal part which is transmitted in continuous with the header signal. As described before, the television signals used throughout the world either have 625 scanning lines or 525 scanning lines. And, the digital video signal in the present invention is a time-sequentially multiplexed signal of picture element data having 572 scanning lines which actually include the picture information, however, the digital video signal is transmitted under the 625-line system. Accordingly, if reproduction is to be carried out under the 525-line system, the number of scanning lines must be converted within the reproducing apparatus as described above before storing the picture element data into the memory circuit. Thus, the address signals must specify a total of four addresses within the memory circuit for the two picture element data corresponding to the upper and lower eight bits of each of the words constituting the video signal part, with respect to the 625-line system and the 525-line system. That is, the address signal 56a indicates the address of the picture element data corresponding to the upper eight bits of the first word constituting the video signal part in the 625-line system, the address signal 57a indicates the address of the picture element data corresponding to the lower eight bits of the first word constituting the video signal part in the 625-line system, the address signal 58a indicates the address of the picture element data corresponding to the first eight bits of the 525-line system obtained by the conversion of the number of scanning lines, and the address signal 59a indicates the address of the picture element data corresponding to the subsequent eight bits of the 525-line system obtained by the conversion of the number of scanning lines.

The seventh through the twelfth words of the header signal shown in FIG. 5 are of a constitution similar to that of the first through sixth words of the header signal described heretofore. The only difference here is that both the upper and lower eight bits of the synchronizing signal 54b corresponding to the seventh word of the header signal, indicate the value "FF". The contents of the various codes in the eighth word 55b and the address signals 56b, 57b, 58b, and 59b, are respectively selected to be the same as the contents of the various codes in the second word 55a and the address signals 56a, 57a, 58a, and 59a. Such selection of the contents are made for the following reasons. That is, as will be described hereinafter, error correcting signals (indicated by P and Q in FIG. 10) are included within the digital video signal shown in FIG. 10 which is to be recorded onto a disc 70. Most of the errors introduced at the transmission path of the digital video signal are corrected by use of the above error correcting signals, however, there are cases where errors which cannot be corrected exist. In such cases, interpolation circuit and the like is used to correct the data with respect to the digital audio signal. With respect to the digital video signal, no problems will be introduced by correcting the picture element data of the digital video signal by use of the picture element data immediately before the picture element data which is to be corrected, since the adjacent picture element data are generally interrelated and close in their values.

However, in the case of the header signal which does not have interrelation of data between adjacent words, it is difficult to carry out such correction. In addition, when the contents of the header signal is not transmitted, it becomes impossible to carry out write-in of the digital video signal part immediately prior thereto. Hence, picture element data corresponding to 2H may become dropped, for example. Therefore, in order to avoid such inconveniences, the information of the header part is transmitted twice as shown in FIG. 5, so that it is possible to carry out write-in of the picture element data by use of a latter half of the header signal part even if the first half of the header signal part is not reproduced in the transmission path. Moreover, because the values of the synchronizing signals 54a and 54b are set to different values, it is possible to discriminate whether the synchronizing signal is the synchronizing signal 54a of the first half of the header signal part or the synchronizing signal 54b of the latter half of the header signal part. It is of course possible to transmit the header signal only once, in which case the header signal will be constituted by six words.

Next, description will be given with respect to the signal format of the video signal parts (divided picture element data groups) $V_1$ through $V_{286}$ shown in FIG. 4. FIG. 6 shows an embodiment of the signal format of the video signal part $V_1$. In FIG. 6, the bit arrangement is shown along the vertical direction with the uppermost bit indicating the MSB and the lowermost bit indicating the LSB, and the time is shown along the horizontal direction, as in FIGS. 4 and 5. In the present embodiment, each of the 286 video signals parts $V_1$ through $V_{286}$ are respectively constituted by 684 words as described before, and each of the video signal parts are transmitted with the picture element data of one scanning line between adjacent scanning lines arranged at the upper eight bits and the picture element data of the other scanning line arranged at the lower eight bits. Accordingly, the signal format of the first video signal part $V_1$ becomes as shown in FIG. 6 wherein a digital video signal series of each of the sampling points in the first scanning line (the first 1H of the first field) positioned at the uppermost part of the picture, is arranged at the upper eight bits of each of the words constituting the video signal part $V_1$. That is, among the plurality of picture elements arranged in a matrix form and constituting one picture, the picture element data from the first row of picture element groups are arranged at the upper eight bits of each of the words constituting the video signal part $V_1$. On the other hand, a digital video signal series of each of the sampling points in the second scanning line (the first 1H of the second field) positioned next to the uppermost part of the picture, is arranged at the lower eight bits of each of the words constituting the video signal part $V_1$. That is, among the plurality of picture elements arranged in the matrix form and constituting one picture, the picture element data from the second row of picture element data groups are arranged at the lower eight bits of each of the words constituting the video signal part $V_1$.

Figure 7:
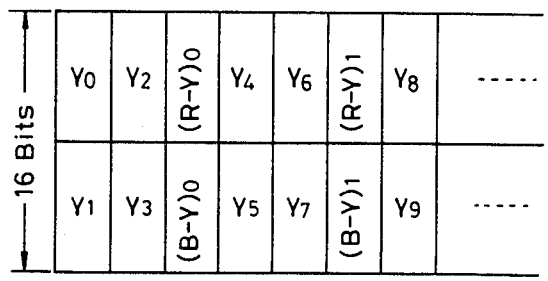
FIG. 7 shows an example of a signal format of the divided picture element data group.

Further, in FIG. 6, $Y_0$ through $Y_{455}$ ($Y_{10}$ through $Y_{455}$ are not shown) indicate positions of each of the picture element data from the first sampling point to the 456-th sampling point of the digital luminance signal in the first scanning line, and $Y_{456}$ through $Y_{911}$ ($Y_{466}$ through $Y_{911}$ are not shown) indicate positions of each of the picture element data from the first sampling point to the 456-th sampling point of the digital luminance signal in the second scanning line. In addition, $(R-Y)_0$ through $(R-Y)_{113}$ and $(B-Y)_0$ through $(B-Y)_{113}$ ($(R-Y)_2$ through $(R-Y)_{113}$ and $(B-Y)_2$ through $(B-Y)_{112}$ are not shown) respectively indicate positions of each of the picture element data from the first sampling point to the 114-th sampling point of the digital color difference signals $(R-Y)$ and $(B-Y)$ in the first scanning line. $(R-Y)_{114}$ through $(R-Y)_{227}$ and $(B-Y)_{114}$ through $(B-Y)_{227}$ ($(R-Y)_{116}$ through $(R-Y)_{227}$ and $(B-Y)_{116}$ through $(B-Y)_{226}$ are not shown) respectively indicate positions of each of the picture element data from the first sampling point to the 114-th sampling point of the digital color difference signals $(R-Y)$ and $(B-Y)$ in the second scanning line. Hence, the video signal part $V_1$ comprises picture element data groups corresponding to 2H of the first and second scanning lines. The signal format of the video signal part $V_1$ is such that the picture element data of the four sampling points of the digital luminance signal and the picture element data of one respective sampling point of the two kinds of digital color difference signals, that is, a total of six picture element data are considered as one unit, and the the digital video signal data are transmitted in terms of this unit. The video signal parts $V_2$ through $V_{286}$ have the signal formats similar to that of the video signal part $V_1$. The picture element data of the same scanning line are not arranged in the same word as shown in FIG. 7, but the picture element data of two adjacent scanning lines are divided and arranged in the same word as shown in FIG. 6. This arrangement shown in FIG. 6 is employed, so that the number of scanning lines can be converted with ease to enable conversion of the system of the digital video signal to the 525-line system from the 625-line system. Furthermore, when the picture element data of two adjacent scanning lines are divided and arranged in the same word and transmitted simultaneously, the number of operations involved in carrying out write-in and read-out with respect to the memory during the operation in which the system is converted into the 525-line system from the 625-line system can be reduced. All the sixteen bits of the EOD signal are "0", however, when the all the bits of the word constituting the video signal parts $V_1$ through $V_{286}$ assume the value "0", the value of the word is changed to a close value so that the LSB of that word is "1" and the rest of the bits are all "0" in order to prevent that word from being erroneously detected as the EOD signal.

Among the different picture information of various categories (maximum of four categories in the present embodiment) identified by the picture category identification code "P.G", the same picture information may be transmitted by the video signal parts $V_1$ through $V_{286}$ corresponding to one frame or transmitted as a whole by the video signal part corresponding to one field. However, the transmission method of the picture information is not limited to these methods, and for example, picture information of mutually different categories may coexist and be transmitted successively. In this case where the picture information of mutually different categories coexist and are transmitted successively, it is possible to select and display the picture information of one of the mutually different categories within the same reproducing interval of the digital audio signal which will be described hereinafter. The picture information of the different categories are transmitted time-sequentially, and the time required to transmit 684 words of one video signal part is actually different according to the video signal part, however, no matter which picture information is displayed, the difference in the displaying time of the picture information of the mutually different categories cannot be sensed by the human eye. Among the picture information of the mutually different categories, the transmission quantity per unit time with respect to one picture information may be made larger than other picture information.

Next, description will be given with respect to a recording system for time-sequentially recording the digital video signal having the signal format shown in FIGS. 4 through 6 onto the disc together with the digital audio signal. In the recording system according to the present invention, the digital video signal is transmitted by the transmission path of one or two channels among the four channels, and the digital audio signal is transmitted by the transmission path of the remaining three or two channels. However, description will hereinafter be given with respect to a case where the digital video signal is transmitted by one channel and the digital audio signal is transmitted by the remaining three channels.

Figure 9:
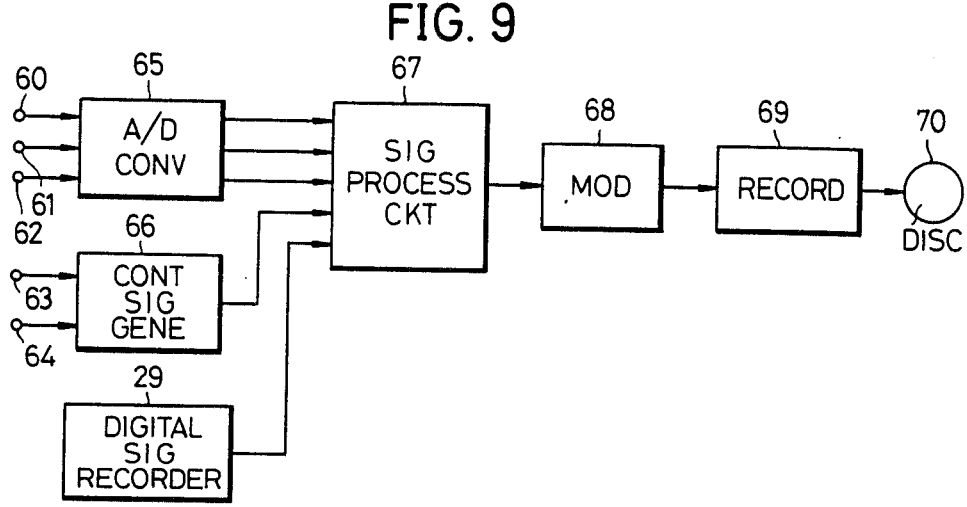
FIG. 9 is a systematic block diagram showing an example of another essential part of the recording system.

FIG. 9 is a systematic block diagram showing an example of an essential part of the recording system for recording signals onto a recording medium from which the signals are reproduced by the reproducing apparatus according to the present invention. In FIG. 9, those parts which are the same as those corresponding parts in FIG. 1 are designated by the same reference numerals. Three channels of analog audio signals are respectively applied to input terminals 60, 61, and 62, and supplied to an analog-to-digital (A/D) converter 65. A signal for central acoustic image intersect is included in the three channels of analog audio signals, and by this signal, it is possible to obtain the real image of the central sound source and enlargement of the listening range which could not be obtained in the conventional 2-channel stereo. In addition, a start signal is applied to an input terminal 63, and a cue signal is applied to an input terminal 64. The cue signal is generated every time the music program of the 3-channel analog audio signal changes to a difference music program. The start signal and the cue signal are supplied to a control signal generating circuit 66.

It will be assumed that a digital signal with a sampling frequency of 44.1 kHz (or 47.25 kHz) and a quantization number of sixteen bits and having an information quantity of one channel, is recorded time sequentially onto the disc 70 which will be described hereinafter for four channels on one track turn. Thus, in this case, the 3-channel analog audio signal supplied to the A/D converter 65 is sampled at a sampling frequency of 44.1 kHz (or 47.25 kHz) with respect to each of the channels, and the signal thus converted into a digital audio signal (PCM audio signal) with a quantization number of sixteen bits with respect to one picture is supplied to a signal processing circuit 67. At the same time, the digital video signal having the signal format shown in FIG. 4 with the sampling frequency of 44.1 kHz (or 47.25 kHz) and the quantization number of sixteen bits with respect to one picture, which is reproduced by the digital recorder 29, is also supplied to the signal processing circuit 67. Moreover, the control signal generating circuit 66 which is supplied with the start signal through the input terminal 63 and the cue signal through the input terminal 64, generates a control signal having a constitution which will be described hereinafter in conjunction with FIG. 11, and supplies this generated control signal to the signal processing circuit 67. As will be described hereinafter, the control signal is used for controlling the position of the pickup and reproducing element during an operation such as a random access and the like.

With respect to the 16-bit input digital signals and the control signal of a total of four channels, the signal processing circuit 67 rearranges these parallel data into series data, and further sections the digital signals of each of the channels into predetermined sections and subjects these digital signals to time-division multiplexing by interleaving. The recording signal is formed by further adding an error code correction signal, error code detection signal, and synchronizing bit for indicating the beginning of the block (frame) to the time-division multiplexed signal.

Figure 10:
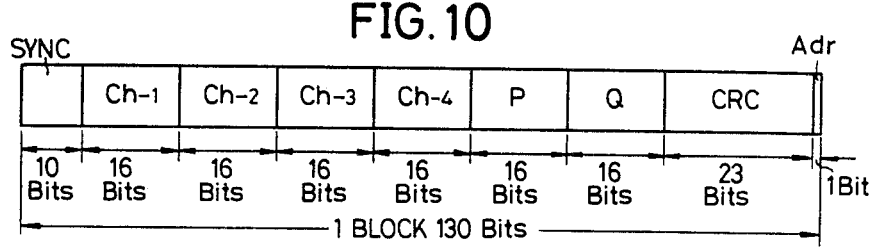
FIG. 10 shows an example of a signal format of one block of a digital signal recorded on a rotary recording medium from which the signal is reproduced by the reproducing apparatus according to the present invention.

FIG. 10 diagrammatically shows an example of one block (one frame) within the recording signal thus formed by the signal processing circuit 67. One block is constituted by 130 bits, and the repetition frequency is 44.1 kHz (or 47.25 kHz) which is equal to the sampling frequency. In FIG. 10, a 10-bit synchronizing signal bit having a fixed pattern for indicating the begging of the block is indicated by SYNC, 16-bit digital audio signals of a total of three channels are respectively indicated by Ch-1 through Ch-3, and 16-bit digital video signal reproduced from the digital recorder 29 is indicated by Ch-4. In addition, P and Q indicated in FIG. 10 respectively are 16-bit error code correction signals, and are signals which are formed satisfying the following equations, for example.

$$P = W_1 \oplus W_2 \oplus W_3 \oplus W_4 \quad (1)$$
$$Q = T^4 W_1 \oplus T^3 W_2 \oplus T^2 W_3 \oplus T\, W_4 \quad (2)$$

In the above equations (1) and (2), $W_1$, $W_2$, $W_3$, and $W_4$ respectively indicate each of the 16-bit digital signals Ch-1 through Ch-4 (normally, these signals are digital signals in different blocks), T indicates a companion matrix of a predetermined polynomial, and $\oplus$ indicates a modulo-2 addition in terms of each of the corresponding bits.

Figure 11:
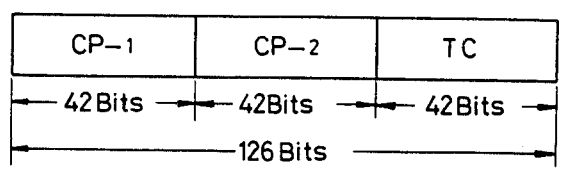
FIG. 11 diagrammatically shows an example of a constitution of a control signal shown in FIG. 10.

In FIG. 10, a 23-bit error code detection signal is indicated by CRC. The error code detection signal CRC is a 23-bit remainder when each of the words Ch-1 through Ch-4, P, and Q are divided by a generator polynomial $X^{23} + X^5 + X^4 + X + 1$, for example. Upon reproduction, the signals from the 11-th bit to the 129-th bit of the same block are divided by the above generator polynomial, and this error code detection code is used to detect that there is no error when the remainder is zero. The control signal described previously is indicated by Adr. One bit of this control signal Adr is transmitted within one block, and for example, all the bits of the control signal are transmitted by 126 blocks. Accordingly, the control signal shown in FIG. 11 is constituted from 126 bits. Thus, if the rotational speed of the disc 70 is 900 rpm, 3150 blocks are recorded or reproduced for one track turn of the disc 70, and as a result, the above 126-bit control signal is recorded or reproduced 25 times for one track turn of the disc 70.

FIG. 11 diagrammatically shows an example of the constitution of the above described control signal. The 126-bit control signal is constituted from a 42-bit first chapter code CP-1, 42-bit second chapter code CP-2, and 42-bit time code TC. The first chapter code CP-1 comprises a 17-bit synchronizing signal, 4-bit mode signal, 8-bit chapter signal, 12-bit chapter local address, and 1-bit parity code which is obtained by carrying out a modulo-2 addition with respect to the signal bits of the mode signal through the chapter local address. The second chapter code CP-2 has the same constitution and values as the first chapter code CP-1, except for the value of the synchronizing signal. The mode signal is a signal indicating the kind of the four channels of digital signal recorded on the disc 70. For example, if the mode signal is "1100", three channels of digital audio signals and one channel of digital video signal are recorded. Similarly, four channels of digital audio signals are recorded when the mode signal is "1101", two channels of two kinds of digital audio signals are recorded when the mode signal is "1110", and two channels of digital audio signals and two channels of digital video signals are recorded when the mode signal is "1111".

Further, the above chapter signal is a signal indicating the position of a recorded music program from the point on the disc 70 where the recording of the signal is started.

For example, the time code TC shown in FIG. 11 comprises a 17-bit synchronizing bit, 4-bit mode signal for indicating the kind of the four channels of digital signals recorded on the disc 70 similar to the mode signals within the first and second chapter codes CP-1 and CP-2, 16-bit time identification code for indicating the position of the recorded music program on the disc 70 in terms of time from the point where the recording of the signal is started, 4-bit track number code which is incremented by one for every track turn of the disc 70 and assumes a value from zero to fourteen in binary code, and 1-bit parity code. The time identification code is indicated by a value such as minutes and seconds, and the minimum unit is one second. However, when the disc 70 rotates at a rotational speed of 900 rpm, the disc 70 undergoes 15 revolutions per second. Hence, even if the time identification code assumes the same value, it is possible to identify the position of the recorded music program by the track number code for each revolution of the disc 70.

The digital signal shown in FIG. 10 comprising 130 bits in one block is successively obtained in series in terms of blocks from the signal processing circuit 67, and supplied to a modulation circuit 68 provided in a succeeding stage. The signal supplied to the modulation circuit 68 is subject to modified frequency modulation (MFM), for example, and is converted into a frequency modulating signal by frequency-modulating a carrier of 7 MHz, for example. This frequency modulating signal from the modulation circuit 68 is recorded onto the disc 70 by a recording apparatus 69 using laser beam and the like.

Figure 12:
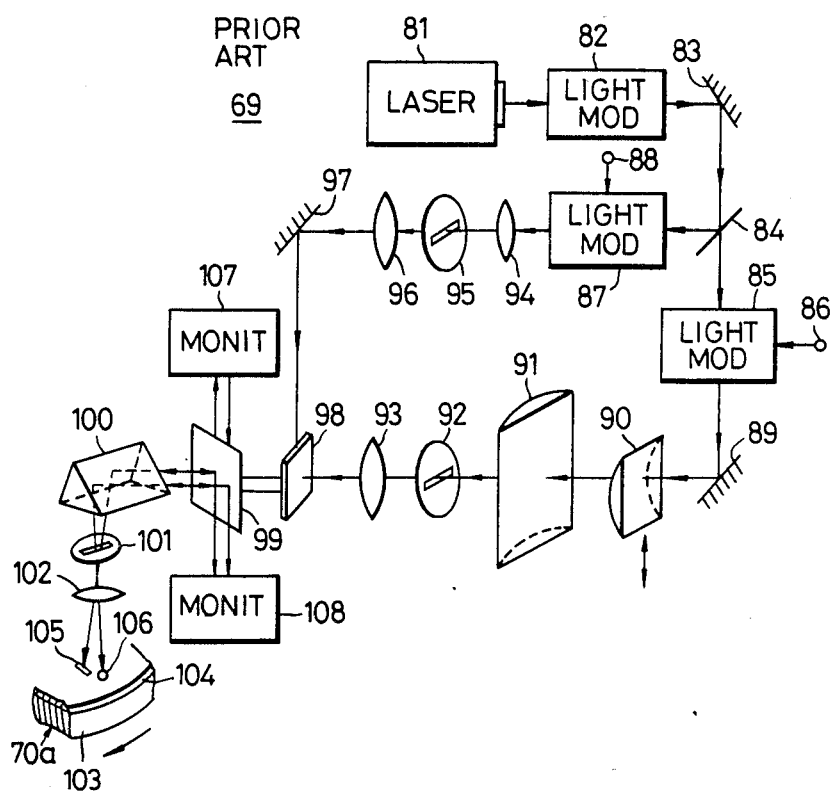
FIG. 12 generally shows an example of a conventional recording apparatus which could be used as the recording apparatus shown in FIG. 9.

A conventional recording apparatus shown in FIG. 12 such as that shown in U.S. Pat. No. 4,315,283, for example, may be used as the recording apparatus 69. In FIG. 12, a laser light emitted from a laser light source 81 is eliminated of its drift, noise, and the like at a light modulator 82, and is reflected at a reflecting mirror 83 and divided into two optical paths by a half mirror 84. One of the divided laser light is modulated by the output frequency modulating signal of the above modulation circuit 68 and the third tracking control signal fp3 which are obtained through an input terminal 86 at a light modulator 85, and converted into a first modulated light beam. The other divided laser light is modulated by the first tracking control signal fp1 or the second tracking control signal fp2 alternately obtained from a recording original disc 70a through an input terminal 88 at a light modulator 87, and is converted into a second modulated light beam.

The first modulated light beam is reflected at a reflecting mirror 89 and changed of its optical path, and is passed through an information recording optical system comprising a cylindrical lenses 90 and 91, a slit 92, and a convex lens 93, and then formed into a rectangular light beam on the recording original disc 70a. On the other hand, the second modulated light beam is passed through a tracking recording optical system comprising a convex lens 94, a slit 95, and a convex lens 96, and formed into a circular light beam on the recording original disc 70a, and further changed of its optical path by a reflecting mirror 97. The first and second modulated light beams thus formed into light beams of predetermined shapes, are composed on substantially the same optical axis by a deflection prism 98, and then pass through a half mirror 99. The optical paths of the light beams obtained through the half mirror 99 are changed by a prism 100, and the light beams then pass through a slit 101 and a recording lens 102 to reach the recording original disc 70a. A layer 104 of photosensitive agent is formed on a glass substrate 103 of the recording original disc 70a, and as a result, the first modulated light beam is focused as a rectangular spot 105 while the second modulated light beam is focused as a circular spot 106 on the recording original disc 70a.

The recording original disc 70a is a disc-shaped medium, and is rotated at a predetermined rotational speed. In addition, the light reflected by the half mirror 99 is applied to a signal monitoring system 107, while the light reflected by the prism 100 is applied to a monitoring optical system 108. The distance between the two modulated light beams on the recording original disc 70a is measured by the monitoring optical system 108, and the error in the distance between the two modulated light beams is monitored by the signal monitoring system 107. This error in the distance between the two modulated light beams on the recording original disc 70a, is corrected by moving the cylindrical lens 90 upwards and downwards in FIG. 12.

The recording original disc 70a is subjected to the known developing processes and disc manufacturing processes, to form a stamper disc. The disc 70 which is duplicated by the stamper disc, is recorded with a frequency-modulated signal of the signal which is obtained by successively time-sequentially multiplexing the three channels of digital audio signals and the one channel of digital video signal having the signal format shown in FIGS. 4 or 6 in terms of blocks where one block has the signal format shown in FIG. 10. This frequency-modulated signal is recorded on a spiral main track on the disc 70 as rows of intermittent pits. The first and second tracking control signals fp1 and fp2, of a constant frequency within a band lower than the band of the above frequency-modulated signal, are alternately recorded as rows of intermittent pits on subtracks at substantially intermediate parts between centerlines of mutually adjacent main tracks for each track turn of the disc. Further, the third tracking control signal fp3 is recorded on the main track at parts where the sides on which the first and second tracking control signals fp1 and fp2 are recorded change over. Tracking grooves for guiding the reproducing stylus are not formed on the disc 70, and the disc 70 has an electrode function.

Hence, according to the present example, the component coded digital video signal part which is a time-sequentially multiplexed signal of the picture element data from each of the picture elements arranged in the matrix form on the screen, is divided into picture element data of picture element groups of the two adjacent rows. The header signal having the signal format shown in FIG. 5 is then added to each of the divided signals, and the EOD signal is added to one word at the last part of the signal. The digital video signal having such constitution is time-sequentially multiplexed with the digital audio signal, and successively recorded onto the disc 70.

Next, description will be given with respect to an embodiment of a reproducing apparatus according to the present invention for reproducing the digital signal recorded on the above described disc 70, by referring to FIG. 13. The disc 70 is placed onto a turntable (not shown) and rotated at a rotational speed of 900 rpm. A bottom of a reproducing stylus 110 slides over the surface of the rotating disc 70. The reproducing stylus 110 is fixed to one end of a cantilever 111, and a permanent magnet 112 is fixed to the other base end of the cantilever 111. The part of the cantilever 111 where the permanent magnet 112 is fixed, is encircled by a tracking coil 113 and a jitter compensation coil 114 fixed to the reproducing apparatus. Right and left coil parts of the jitter compensation coil 114 are wound in the same phase, and thus, attracting forces or repulsive forces simultaneously act on the permanent magnet 112 according to the polarity of a jitter compensation signal. Hence, the cantilever 111 is moved along a tangential direction with respect to the tracks on the disc 70, to compensate for the jitter introduced due to the surface oscillation or eccentricity of the disc 70. Further, the tracking coil 113 generates a magnetic field along a direction perpendicular with respect to the magnetic direction of the permanent magnet 112. Accordingly, the cantilever 111 is moved along one of the directions in the width direction of the track according to the polarity of a tracking error signal from a tracking servo circuit 115 with a displacing quantity according to the magnitude of the tracking error signal.

A high-frequency reproduced signal is obtained from a pickup circuit 116. This pickup circuit 116 comprises a resonance circuit the resonance frequency of which is varied in response to the variations in electrostatic capacitance formed between an electrode fixed to a rear surface of the reproducing stylus 110 by deposition and the disc 70 according to the rows of intermittent pits, a circuit for applying a signal of a constant frequency to this resonance circuit, a circuit for amplitude-detecting a high-frequency signal from the resonance circuit varying in its amplitude according to the above variations in the electrostatic capacitance, and a circuit for preamplifying the amplitude-detected high-frequency signal (reproduced signal). The high-frequency signal obtained from the pickup circuit 116 is supplied to a frequency demodulating circuit 117 wherein the main information signal (the digital audio signals and the time-sequentially multiplexed digital video signal in this case) from the main track is demodulated on one hand, and a part thereof is separated and supplied to the tracking servo circuit 115.

The tracking servo circuit 115 frequency-selects and obtains the first through third tracking control signals fp1 through fp3 from the reproduced signal. Envelopes of the first and second tracking control signals fp1 and fp2 thus obtained are detected and passed through a differential amplifier (not shown) to obtain the tracking error signal, and this tracking error signal is supplied to the tracking coil 113. Here, it must be noted that the positional relationships between the first and second tracking control signals fp1 and fp2 with respect to the main track changes for each track turn of the disc 70. Accordingly, the tracking polarity is reversed for each track turn of the disc 70, by a switching pulse produced according to the detection or reproduction of the third tracking control signal fp3. The tracking servo circuit 115 drives the tracking coil 113 so that the reproducing stylus 110 is forcibly shifted by one or more track pitch along the track width direction according to a kick instruction signal, when the kick instruction signal is applied to an input terminal 118.

On the other hand, the demodulated digital signal obtained from the frequency demodulator 117 is applied to a decoder 119 wherein the demodulated digital signal is subjected to MFM demodulation and formed into the time-sequentially multiplexed signal having the signal format shown in FIG. 10. The beginning of the block of the time-sequentially multiplexed signal is detected according to the synchronizing signal bit SYNC, and the series signal is converted into a parallel signal, and furthermore, the error is detected. The error code correction signals P and Q are used to correct the error and restore the signal only when an error is detected. Hence, by correcting the error and restoring the signal according to the needs, three channels of the 16-bit digital audio signals comprising no errors among the four channels of 16-bit digital signals restored to their original order with interleaving signal arrangement, are converted into analog audio signals by a digital-to-analog (D/A) converter within the decoder 119 and produced through output terminals 120a, 120b, and 120c. In addition, the pickup control signal is supplied to a predetermined circuit (not shown) for carrying out high-speed search and the like.

The digital video signal having the signal format shown in FIG. 4 (or FIG. 6) which is time-sequentially reproduced from the fourth channel, is supplied to a converting circuit 121 shown in FIG. 13 for converting the number of scanning lines. The number of scanning lines is converted into 525 lines from 625 lines at the converting circuit 121.

Figure 14:
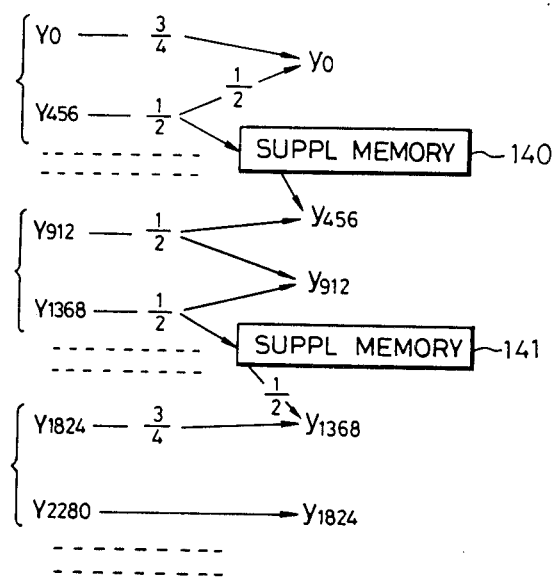
FIG. 14 is a diagram for explaining an example of a converting operation of a converting circuit within the block system shown in FIG. 13 for converting the number of scanning lines.

FIG. 14 diagrammatically shows the manner in which the number of scanning lines is converted. In FIG. 14, $Y_0$ indicates the picture element data of the first sampling point of the digital luminance signal in the first scanning line of the 625-line system, and $Y_{456}$ indicates the picture element data of the first sampling point of the digital luminance signal in the second scanning line of the 625-line system, as in the case shown in FIG. 6. As seen from the case shown in FIG. 6, the above picture data $Y_0$ and $Y_{456}$ are transmitted first in the video signal part $V_1$. Data obtained by multiplying $\frac{3}{4}$ by the picture element data $Y_0$, is formed by adding the data obtained by shifting the data $Y_0$ by one bit towards the LSB and the data obtained by shifting the data $Y_0$ by two bits towards the LSB. Data obtained by multiplying $\frac{1}{4}$ by the picture element data $Y_{456}$, is formed by shifting the data $Y_{456}$ by two bits towards the LSB. A picture element data $y_0$ indicating the picture element data of the first sampling point of the digital luminance signal of the 525-line system in the first scanning line, is obtained by mixing the above data obtained by multiplying $\frac{3}{4}$ by the data $Y_0$ and the data obtained by multiplying $\frac{1}{4}$ by the data $Y_{456}$. Moreover, a data obtained by multiplying $\frac{1}{2}$ by the picture element data $Y_{456}$ is stored in a supplementary memory (1-line memory) 140. Thereafter, the data obtained by multiplying $\frac{3}{4}$ by the picture element data of each of the sampling points in the first scanning line of the 625-line system, and the data obtained by multiplying $\frac{1}{4}$ by the picture element data of each of the sampling points in the second scanning line of the 625-line system, are similarly mixed with respect to the sampling points in the same word, to obtain the picture element data of the first scanning line of the 525-line system.

The picture element data of each of the sampling points in the third scanning line of the 625-line system related to the video signal part $V_2$ which is next reproduced is multiplied by $\frac{1}{2}$, by shifting the data by one bit towards the LSB, and mixed with the picture element data read out from the supplementary memory 140 with respect to the same sampling point. As a result, the picture element data of the second scanning line of the 525-line system is obtained. In FIG. 14, $Y_{912}$ indicates the picture element data of the first sampling point of the digital luminance signal in the third scanning line of the 625-line system, and $Y_{456}$ indicates the picture element data of the first sampling point of the digital luminance signal in the second scanning line of the 525-line system. Further, $Y_{1368}$, $Y_{1824}$, and $Y_{2280}$ respectively indicate picture element data of the digital luminance signal of the 625-line system. $Y_{1368}$ indicates the picture element data of the first sampling point in the fourth scanning line, $Y_{1824}$ indicates the picture element data of the first sampling point in the fifth scanning line, and $Y_{2280}$ indicates the picture element data of the first sampling point in the sixth scanning line. In addition, $y_{912}$, $y_{1368}$, and $y_{1824}$ respectively indicate picture element data of the digital luminance signal of the 525-line system. $y_{412}$ indicates the picture element data of the first sampling point in the third scanning line, $y_{1368}$ indicates the picture element data of the first sampling point in the fourth scanning line, and $y_{1824}$ indicates the picture element data of the first sampling point in the fifth scanning line.

As seen from FIG. 14, the data obtained by multiplying ½ to the picture element data such as $Y_{912}$ of each of the sampling points in the third scanning line of the 625-line system, and the data obtained by multiplying ½ to the picture element data such as $Y_{1368}$ of each of the sampling points in the fourth scanning line of the 625-line system, are mixed to obtain the picture element data such as $y_{912}$ of each of the sampling points in the third scanning line of the 525-line system. Moreover, the data obtained by multiplying ½ to the picture element data such as $Y_{1368}$ of each of the sampling points in the fourth scanning line of the 625-line system, is stored in a supplementary memory (1-line memory) 141. Similarly, the picture element data such as $Y_{1824}$ of each of the sampling points in the fifth scanning line of the 625-line system is multiplied by ¾, and mixed with the data obtained by multiplying ½ to the picture element data with respect to the same sampling point read out from the supplementary memory 141, to obtain the picture element data such as $y_{1368}$ of the fourth scanning line of the 525-line system. Furthermore, the picture element data such as $Y_{2280}$ of the sixth scanning line of the 625-line system is used as it is as the picture element data such as $y_{1824}$ of the fifth scanning line of the 525-line system. Operations similar to the above described operations are repeatedly carried out. Therefore, the picture element data of the six scanning lines of the 625-line system are mixed with predetermined mixing ratios, and converted into picture element data of the five scanning lines of the 525-line system.

As may be understood from the description given heretofore, the supplementary memories 140 and 141 used for carrying out operations when converting the number of scanning lines, may be realized by a common 1-line memory. In this case, the common 1-line memory is used in turns as the supplementary memories 140 and 141. On the other hand, the number of sampling points (the number of picture element data) of the digital luminance signal can be described by the product of the number of sampling points in one horizontal scanning line which is 456 and the effective number of scanning lines which is 572, and is equal to 260,832. The number of bits available by use of four 64k-RAMs is 262,144 ($=2^{16} \times 4$), and therefore, 1312 bits are additionally available. That is, sufficient memory space or capacity is additionally available for storing the picture element data of sampling points of the digital luminance signal corresponding to over 2H, when four 64k-RAMs are used. Accordingly, this additionally available memory space can be used as the supplementary memories 140 and 141. The read-out and write-in with respect to the supplementary memories 140 and 141 are carried out within a horizontal blanking period of a color video signal of a standard television system (NTSC system in the present embodiment) which is obtained through an output terminal 136.

The scanning line number converting circuit 121 converts the picture element data of the 625-line system into picture element data of the 525-line system in the manner described heretofore, and the converting operation is simple because the picture element data are transmitted with the signal format shown in FIG. 6. This scanning line number converting circuit 121 is only needed in the reproducing apparatus shown in FIG. 13 where it is necessary to reproduce and produce an analog color video signal in accordance with the NTSC system which is a 525-line system, and there is no need for the scanning line number converting circuit 121 in reproducing apparatuses where it is only necessary to reproduce and produce an analog color video signal in accordance with the PAL system or the SECAM system which are 625-line systems. However, a switch for switching the input and output of the scanning line number converting circuit 121 may be provided in some reproducing apparatuses. In such reproducing apparatuses, the switch can be switched to make the scanning line number converting circuit 121 operative or inoperative according to the number of scanning lines of the television system. The output picture element data of the scanning line number converting circuit 121 is supplied to a memory 128 or 129 through a switching circuit 122.

The digital video signal successively obtained time-sequentially from the decoder 119 with the signal format shown in FIG. 4, is supplied to a synchronizing signal detecting circuit 123, a header signal detecting circuit 125, and a memory write controller 126. The synchronizing signal detecting circuit 123 detects the synchronizing signal 54a or 54b and the EOD signal within the header signal shown in FIG. 5, and supplies a detection signal to a control circuit 124. This synchronizing signal detecting circuit 123 is constructed so that when the synchronizing signal 54a or 54b is detected, the data of the five words (or eleven words) obtained immediately after the detected synchronizing signal is not detected as a synchronizing signal even if the value is the same as that of the synchronizing signal 54a or 54b. Accordingly, it is possible to prevent signals other than the synchronizing signals 54a and 54b within the header signal, and further, the picture element data, from being erroneously detected as the synchronizing signal. The header signal detecting circuit 125 discriminates each of the codes within the header signal shown in FIG. 5, and supplies a resulting output to the control circuit 124.

The control circuit 124 is supplied with signals such as a synchronizing signal detection signal from the synchronizing signal detecting circuit 123, detection signals of each of the codes within the header signal obtained from the header signal detecting circuit 125, and a signal (category number signal) specifying the desired category (various kinds of special picture identified by the picture category identification code "P.G") selected by the user of the reproducing apparatus and applied to an input terminal 127 by manipulating an external switch and the like. The control circuit 124 discriminates each of the signals supplied thereto, and controls the scanning line number converting circuit 121, the switching circuit 122, the memory write controller 126, a switching circuit 131, and the like. The output digital video signal of the scanning line number converting circuit 121 which is selectively produced through the switching circuit 122, is supplied to one of the memories 128 and 129. The digital video signal supplied to one of the memories 128 and 129 is successively written in according to a write-in control signal from the memory write controller 126, at the addresses specified by two of the address signals 56a through 59a (or 56b through 59b) shown in FIG. 5. In the present embodiment, the reproducing apparatus reproduces the analog color video signal of the 525-line system, and for this reason, the output digital video signal of the scanning line number converting circuit 121 which is selectively produced through the switching circuit 122 is successively written in at the addresses after the conversion of the number of scanning lines specified by the address signals 58a and 59a (or 58b and 59b). In addition, the header signals $H_1$ through $H_{286}$ and the EOD signal shown in FIG. 4 are not written into the memories 128 and 129, and the memory write controller 126 is controlled so that the video signal parts $V_1$ through $V_{286}$ are written into the memories 128 and 129.

The memories 128 and 129 normally write in the reproduced picture element data alternately in terms of one frame or one field. However, in the present embodiment, the memory 128 or 129 which is specified by the write-in specifying code "B19W" shown in FIG. 5 writes in the reproduced picture element data within the horizontal blanking period.

The memories 128 and 129 simultaneously reads out the reproduced picture element data which is written in according to a read-out control signal from a memory read controller and synchronizing signal generator 130, and also compensate for the jitter introduced upon reproduction. The digital luminance signal read out from the memories 128 and 129 is read out with a sampling frequency of 9 MHz and a quantization number of eight bits with respect to one picture, and the first and second digital color difference signals read out from the memories 128 and 129 are read out with a sampling frequency of 2.25 MHz and a quantization number of eight bits with respect to one picture. The digital luminance signal and the first and second digital color difference signals thus read out from the memories 128 and 129, are supplied to the switching circuit 131.

The switching circuit 131 selectively produces the read out outputs from one of the memories 128 and 129 according to a switching control signal from the control circuit 124, and supplies the selectively produced outputs to digital-to-analog (D/A) converters 132, 133, and 134. When the switching control signal from the control circuit 124 is the read-out specifying code "B19R" shown in FIG. 5, the switching circuit 131 selectively produces the read out outputs of the memory 128 or 129 which is specified by the read-out specifying code "B19R". On the other hand, when the switching control signal from the control circuit 124 is a control signal obtained when the EOD signal is detected, the switching circuit 131 switches to selectively produce the read out outputs of the memory 128 or 129, which were not produced up to that point in time.

The time required for the switching circuit 131 to switch is normally exceedingly short. However, when a special effect such as fade-in is to be carried out, the switching circuit 131 is intentionally switched gradually by taking a specific time period (one second, for example).

Among the three kinds of digital signals passed through the switching circuit 131, the digital luminance signal is converted into an analog luminance signal by being subjected to digital-to-analog conversion at the D/A converter 132 and then supplied to an encoder 135. On the other hand, the two kinds of digital color difference signals are respectively converted into color difference signals (B-Y) and (R-Y) by being subjected to digital-to-analog conversion at the D/A converters 133 and 134, and then also supplied to the encoder 135. The encoder 135 produces a color video signal in accordance with the NTSC system, from the three kinds of analog signals from the D/A converters 132 through 134 and the horizontal synchronizing signal, vertical synchronizing signal, color burst signal, and the like from the memory read controller and synchronizing signal generator 130. This NTSC system color video signal thus produced from the encoder 135 is obtained through the output terminal 136. This NTSC system color video signal is reproduced and displayed as a color still picture or a partially moving picture of high quality by a television receiver (not shown), and is used as supplementary information to the listener when the audio signals are reproduced as sounds through the output terminals 120a, 120b, and 120c.

In the reproducing apparatus described heretofore, the header signal is reproduced with a predetermined period. Hence, the picture transmission identification code "A/$\overline{P}$" which is reproduced in continuous with the synchronizing signal 54a is detected at the header signal detecting circuit 125, to determine whether the type of transmission is transmission of the full picture or transmission of a part of the picture. When it is determined that the type of transmission is the transmission of the full picture, the number of words in one video signal part is discriminated by a counter within the memory write controller 126. In a case where the synchronizing signal 54a is missing due to dropout and the like, the synchronizing signal detecting circuit 123 produces a synchronizing signal detection signal as if the synchronizing signal 54a was reproduced with a predetermined period. Accordingly, the memory 128 or 129 can correctly carry out write-in of the picture element data according to the write-in control signal from the memory write controller 126.

When the various codes in the second word of the header signal are missing due to dropout and the like, a flag signal will indicate such a missing state. The control circuit 124 is constructed to operate as if the codes within the header signal obtained immediately prior to the header signal comprising the dropout and the like in its second word is obtained, according to this flag signal. Further, even when one of the address signals 56a through 59a are missing, a flag signal will indicate such a missing state. In this state, the memory write controller 126 increments the addresses by one according to the flag signal, so that the subsequent incoming picture element data are written into the memory 128 or 129 at addresses where the picture element data should originally be written in. Because the addresses are incremented by one for every six words constituting the picture element data of one line, the last address of one video signal part comprising 684 words will becomes incremented by 114 from its original last address.

Therefore, even if there is dropout and the like within a part of the header signal or within the entire header signal, it is possible to compensate for such dropout and the like in the header signal.

Next, detailed description will be given with respect to the constitution and operation of the memories 128 and 129, by referring to FIG. 15. In FIG. 15, $M_{11}$, $M_{21}$, ..., $M_{61}$, $M_{12}$, $M_{22}$, ..., $M_{62}$, $M_{13}$, $M_{23}$, ..., $M_{63}$, $M_{16}$, ..., $M_{66}$ respectively are 64k-RAMs. These thirty-six 64k-RAMs are respectively supplied with an address signal from a common address signal generator 142 within the memory write controller 126. If the memories 128 and 129 are frame memories, it is necessary to provide two sets of arrangements of thirty-six 64k-RAMs each comprising the RAMs $M_{11}$ through $M_{66}$, however, it is only necessary to provide one set of the arrangement of thirty-six 64k-RAMs if the memories 128 and 129 are field memories. That is, if the memories 128 and 129 are field memories, the memory part shown in FIG. 15 corresponds to the memories 128 and 129, a part of the memory write controller 126 which is shown as the address signal generator 142, and a part of the scanning line number converting circuit 121 which corresponds to the supplementary memory used for carrying out operations upon conversion of the number of scanning lines. On the other hand, if the memories 128 and 129 are frame memories, the memory part shown in FIG. 15 corresponds to one of the memories 128 and 129, a part of the memory write controller 126 which is shown as the address signal generator 142, and a part of the scanning line number converting circuit 121 which corresponds to the supplementary memory used for carrying out operations upon conversion of the number of scanning lines. Although omitted in FIG. 15, the memory part actually includes first and second buffer memories. The first buffer memory is provided for storing the picture element data groups corresponding to 1H which are obtained through the switching circuit 122 and transmitted by the upper eight bits of each of the words within the video signal part having the signal format shown in FIG. 4. The second buffer memory is provided for storing the picture element data groups corresponding to 1H which are obtained through the switching circuit 122 and transmitted by the lower eight bits of each of the words within the video signal part having the signal format shown in FIG. 4.

Each of the bits of the picture element data obtained from the first and second buffer memories are respectively supplied to switches $S_1$ through $S_6$ having six contacts, through respective input terminals 143-1 through 143-6. The switches $S_1$ through $S_6$ actually are analog switches which operate electrically. The switch $S_1$ supplies the MSB of the picture element data to one of the RAMs $M_{11}$, $M_{12}$, ..., $M_{16}$. Similarly, a switch $S_i$ (i is an integer from 2 to 6) supplies the i-th bit of the picture element data counted from the MSB (MSB is considered as the first bit) to one of the RAMs $M_{ij}$ (j is an integer from 1 to 6). Accordingly, in the memory part shown in FIG. 15, the lower two bits among the eight bits of picture element data are discarded, however, there is substantially no effect on the reproduced picture by such discarding of the lower two bits of the picture element data. It is of course possible to add twelve more 64k-RAMs to the memory part shown in FIG. 15, to store all the eight bits of the picture element data. However, in the digital video signal reproducing apparatus for home use, it will be more advantageous to use the memory part having the construction shown in FIG. 15 in order to keep the cost of the reproducing apparatus low.

Next, description will be given with respect to the operation of the memory part shown in FIG. 15. For the sake of convenience, description will be given with respect to a reproducing apparatus in which the reproduced digital video signal is directly supplied to the memories 128 and 129, and carries out reproduction to produce an analog color video signal in accordance with the PAL system or the SECAM system. First, a 16-bit address signal having a value "0000" in hexadecimal is supplied to the RAMs $M_{11}$ through $M_{66}$ from the address signal generator 142. On the other hand, the upper six bits of the picture element data $Y_0$ shown in FIG. 6 are supplied to the RAMs $M_{11}$, $M_{21}$, $M_{31}$, $M_{41}$, $M_{51}$, and $M_{61}$ from the first buffer memory, through the switches $S_1$ through $S_6$. Hence, the MSB of the data $Y_0$ is stored at the address "0000" in the RAM $M_{11}$, and the second bit of the data $Y_0$ is stored at the address "0000" in the RAM $M_{21}$. Similarly, the third, fourth, fifth, and sixth bits of the data $Y_0$ are respectively stored at the address "0000" in the respective RAMs $M_{31}$, $M_{41}$, $M_{51}$, and $M_{61}$.

Then, the value of the address is kept the same, and the switches $S_1$ through $S_6$ are switched to respectively become connected to another contact. Thus, the upper six bits of the picture element data $Y_1$ are respectively stored at the address "0000" in the respective RAMs $M_{12}$, $M_{22}$, $M_{32}$, $M_{42}$, $M_{52}$, and $M_{62}$. Similarly thereafter, the value of the address is kept the same to "0000" and the switches $S_1$ through $S_6$ are successively switched to become connected to other contacts, and the first six bits of the picture element data $Y_2$, $Y_3$, $(R-Y)_0$, and $(B-Y)_0$ are respectively stored at the address "0000" of the respective RAMs $M_{13}$ through $M_{63}$, $M_{14}$ through $M_{64}$, $M_{15}$ through $M_{65}$, and $M_{16}$ through $M_{66}$. By these series of operations, the first divided picture element data group in the first scanning line, that is, the four luminance picture element data and the two color difference picture element data, are stored into the memory part. Next, an address signal having a value "0001" in hexadecimal is produced from the address signal generator 142, and the upper six bits of the picture element data $Y_4$, $Y_5$, $Y_6$, $Y_7$, $(R-Y)_1$, and $(B-Y)_1$ are respectively stored at the address "0001" of the respective RAMs $M_{11}$ through $M_{66}$. These operations are repeated by incrementing the value of the address by one, to complete storing of the picture element data groups in the first scanning line into the RAMs $M_{11}$ through $M_{66}$. Next, an address signal having a value "0072" in hexadecimal is generated by the address signal generator 142, and the upper six bits of the picture element data $Y_{456}$ of the first sampling point in the second scanning line shown in FIG. 6 are respectively supplied to the RAMs $M_{11}$, $M_{21}$, $M_{31}$, $M_{41}$, $M_{51}$, and $M_{61}$ from the second buffer memory, through the switches $S_1$ through $S_6$, and stored into these RAMs. Then, the value of the address is kept the same and the switches $S_1$ through $S_6$ are switched, and the upper six bits of the picture element data $Y_{457}$ obtained from the second buffer memory are respectively supplied to the RAMs $M_{12}$, $M_{22}$, ..., and $M_{62}$. Accordingly, the MSB of the picture element data $Y_{457}$ is stored at the address "0072" in the RAM $M_{12}$. Similarly, the second, third, fourth, fifth, and sixth bits of the picture element data $Y_{457}$ are respectively stored at the address "0072" in the RAMs $M_{22}$, $M_{32}$, ..., and $M_{62}$. Thereafter, the value of the address is successively incremented by one to complete storing of the picture element data groups in the second scanning line. The video signal parts $V_3$, $V_4$, $V_5$, ... are stored similarly, and the storing of data corresponding to one frame (or one field) is completed when the last picture element data group in the 571-st and 572-nd scanning lines (or 285-th and 286-th scanning lines in the case of storing of data corresponding to one field) are stored at the addresses "FE45" and "FEB7" (addresses "7EE9" and "7F5B" in the case of storing of data corresponding to one field) in the RAMs.

Thus, the picture element data corresponding to one frame are stored into the RAMs $M_{11}$ through $M_{66}$, or the picture element data corresponding to one field are stored into the RAMs $M_{11}$ through $M_{66}$ for two fields. Moreover, among the picture element data transmitted by the six continuous words, the picture element data (four picture element data of the digital luminance signal and two picture element data of the digital color difference signals) related to the same scanning line are stored at the same address in the thirty-six RAMs $M_{11}$ through $M_{66}$. Because the memory part shown in FIG. 15 is driven by the same address signal, it is necessary to time-divisionally carry out the write-in and read-out. Hence, by using the read-out control signal from the memory read controller and synchronizing signal generator 130, the read-out with respect to the RAMs $M_{11}$ through $M_{66}$ is carried out within a video interval (approximately 51 $\mu$sec) in which the picture information is transmitted within a 1H period (64 $\mu$sec), and the write-in with respect to the RAMs $M_{11}$ through $M_{66}$ is carried out within the horizontal blanking period (approximately 13 $\mu$sec). In addition, the read-out with respect to the RAMs $M_{11}$ through $M_{66}$ is carried out so that the above six picture element data stored at the same address in the respective RAMs are read out simultaneously, and the value of the address is incremented by one from the value "0000".

When producing the analog video signal in accordance with the NTSC system from the reproduced signal, the number of scanning lines of the digital video signal obtained from the decoder 119 is converted at the scanning line number converting circuit 121, before carrying out the write-in with respect to the memories 128 and 129. In this case, the write-in operations with respect to the memory part shown in FIG. 15 are the same as those described heretofore, except in that the number of data is reduced to 5/6 the number of data in the above case due to the conversion of the number of scanning lines. Therefore, detailed description for this case will be omitted.

The music program and the color picture reproduced from the disc 70 must be reproduced in synchronism with each other. However, it takes a predetermined time period in order to store the picture element data corresponding to one frame (or one field) into the memories 128 and 129, and the digital video signal must be recorded at a point which leads the point where the display of the picture is to be started by the above predetermined time period. Accordingly, the digital video signal which is to be reproduced from the start of the music program, is recorded at a point which leads a point where the recording of that music program is started by the above predetermined time period. For this reason, when a random access operation is carried out with respect to the disc 70, the reproducing stylus 110 is fed at a high speed from the outer periphery to the inner periphery of the disc 70 to reproduce the control signal having the signal format shown in FIG. 11, and a chapter code within the reproduced control signal is compared with the chapter code of a desired music program specified by the user. The reproduction of an arbitrary mode such as normal reproduction is started from a point where the reproducing stylus 110 has reached the beginning of the desired music program, however, in such instances, the digital video signal may be reproduced from an intermediate point thereof, that is, not from the beginning thereof. In such a case, if the synchronizing signal only exists at the beginning of the digital video signal corresponding to one frame or one field of the picture, the digital video signal reproduced from the intermediate point thereof cannot be displayed. However, according to the present embodiment, the header signal is arranged preceding the divided picture element group corresponding to 2H as shown in FIG. 4. Hence, in the present embodiment, even if the digital video signal is reproduced from the intermediate point thereof, it is possible to write in and read out the digital video signal arranged subsequent to the first header signal part which is reproduced beyond that intermediate point and display that digital video signal.

In this case where the digital video signal is reproduced from the intermediate point thereof, when it is detected from the picture transmission identification code "A/$\overline{P}$" that the full picture is transmitted, it is possible to write in the picture element data into the memory 128 or 129 until the EOD signal which is transmitted by the last word of the digital video signal having the picture element data corresponding to one picture is reproduced, and not display the digital video signal reproduced from the intermediate point thereof until the EOD signal is reproduced. In this case, a part of the picture will be missing in the display of the color still picture.

On the other hand, when it is detected that a part of the picture is transmitted, the digital video signal reproduced from the intermediate point thereof is normally not displayed. However, it is possible to carry out successive display.

Figure 16:
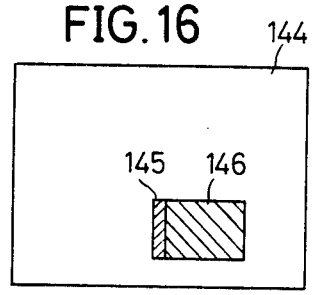
FIG. 16 is a diagram for explaining an operation in which a limited small portion of the picture is changed in the reproducing apparatus according to the present invention.

When displaying the lyrics of a song and the like at a part of the picture, it is possible to quickly change the display of that part of the picture if the picture information related to that part of the picture is transmitted in a concentrated manner. Similarly, it is possible to display a moving picture within a limited part of the picture. That is, when displaying a moving picture within a limited small picture part 146 of a reproducing screen 144 shown in FIG. 16, an operation is repeated in which the picture element data are transmitted in continuous with the header signal comprising the address signals 56a through 59a and 56b through 59b which specify the addresses of this small picture part 146. The header signal is transmitted at a position indicated by 145 in FIG. 16. However, this header signal is not displayed on the screen 144 as described before. The picture element data of the small picture part 146 are written into one of the memories 128 and 129 from which the digital video signal corresponding to the picture being displayed on the screen 144 is read out. As a result, the picture element data of the small picture part 146 which is written into one of the memories 128 and 129 are displayed within the small picture part 146 as a moving picture. When transmitting a part of the picture, the transmission time differs according to the area of the display. Thus, a moving picture can be displayed if the transmission time of the picture to be displayed within the small picture part 146 is short.

Description was given heretofore with respect to standard picture transmission of the 625-line system. However, when carrying out picture transmission of a system with the high definition or transmission of a moving picture according to the run-length code, the mode of the picture is identified by the value of the picture mode identification code "MODE". Moreover, a picture transmission format different from that shown in FIG. 6 is employed. In addition, the value of the picture mode identification code "MODE" is identified to control the scanning line number converting circuit 121 and the memory write controller 126 by the output signals of the control circuit 124 according to the needs, and the write-in and read-out formats of data with respect to the memories 128 and 129 are selected. For example, when it is identified from the picture mode identification code "MODE" that the digital video signal of the high definition system is reproduced, the memory write controller 126 is controlled so that the memories 128 and 129 do not write in the reproduced high-definition digital video signal, or the memory write controller 126 is controlled so that the reproduced high-definition digital video signal is compressed and written into the memories 128 and 129. Further, changes may be made in the operation of the scanning line number converting circuit 121 so that the number of scanning lines of the reproduced high-definition digital video signal is converted into 625 lines or 525 lines from 1125 lines. Moreover, measures may be taken so that the transmission of data corresponding to one frame and transmission of data corresponding to one field coexist. In this case, the number of words in the header signal is twelve (or six) and does not change, however, the value of the picture information quantity identification code "FR/FL" and the signal format of the digital video signal are different. When transmitting data corresponding to one field, for example, the video signal parts which are divided in terms of 2H, and a total of 143 of such video signal parts are transmitted. The reproducing apparatus identifies the above different value of the picture information quantity identification code "FR/FL", and carries out the write-in with respect to the memories 128 and 129 according to the signal format of the digital video signal.

Moreover, even if the digital video signal supplied to the memories 128 and 129 is shifted by one word due to some cause, such shift by one word will be corrected by reproducing the subsequent header signal, and errors due to time-shift of words do not become accumulated.

Figure 17:
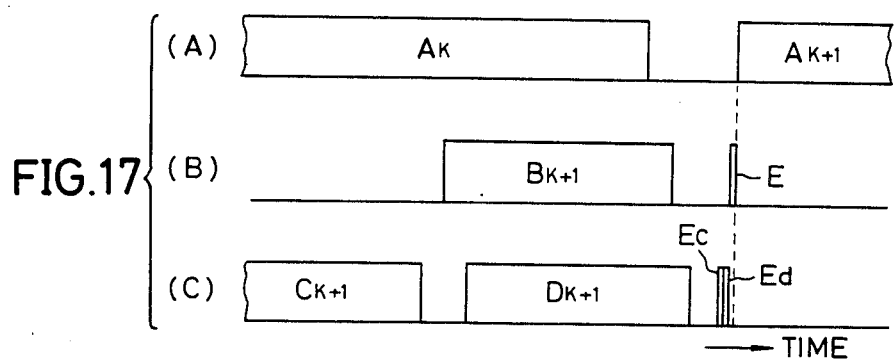
FIGS. 17A, 17B, and 17C diagrammatically show examples of relationships between recording positions of signals reproduced by the reproducing apparatus according to the present invention.

Next, description will be given with respect to the recording and reproduction of the EOD signal. It will be assumed that the digital audio signal recorded on the disc 70 relates to a plurality of music programs, and that a recording interval $A_K$ shown in FIG. 17(A) indicates the recording interval of the digital audio signal corresponding to the k-th (k is an integer) music program while a recording interval $A_{K+1}$ indicates the recording interval of the digital audio signal corresponding to the (K+1)-th music program. If it is assumed that one color still picture among one or more pictures which are successively reproduced during the reproducing interval of the (K+1)-th music program is displayed simultaneously as the start of reproduction, the digital video signal related to this color still picture must be recorded as indicated by a digital video signal recording interval $B_{K+1}$ in FIG. 17(B). That is, the picture element data corresponding to one frame or one field and the header signal are recorded in the digital video signal recording interval $B_{K+1}$ at a position prior to the start of the audio signal recording interval $A_{K+1}$. Moreover, the EOD signal at the last word of the digital video signal corresponding to one frame or one field, is recorded at a recording interval E shown in FIG. 17(B) subsequent to the recording interval $B_{K+1}$, at a position coinciding with the start of the recording interval $A_{K+1}$. FIG. 17(B) shows a case where the digital video signal relates to only one category of picture information. Another arrangement of the recording intervals is possible, where the picture element data from the last row or last few rows (or last column or last few columns) of the picture element groups are not recorded within the recording interval $B_{K+1}$ shown in FIG. 17(B) and these picture element data are recorded immediately prior to the recording interval E of the EOD signal.

On the other hand, when digital video signals related to a plurality of categories are successively recorded, the digital video signal related to one of the categories must be reproduced simultaneously as the start of reproduction of the digital audio signal recording interval $A_{K+1}$ shown in FIG. 17(A). FIG. 17(C) shows a case where there are digital video signals related to two categories. The digital video signals related to color still pictures of two categories are successively recorded within recording intervals $C_{K+1}$ and $D_{K+1}$ in FIG. 17(C), without recording the EOD signal within these recording intervals $C_{K+1}$ and $D_{K+1}$. A signal comprising the header signal having the signal format shown in FIG. 5 and including codes "P.G" and the like for indicating the category of the picture recorded in the recording interval $C_{K+1}$, and the EOD signal, is time-sequentially recorded within an interval $E_c$ shown in FIG. 17(C). A signal comprising the header signal having the signal format shown in FIG. 5 and including codes "P.G" and the like for indicating the category of the picture recorded in the recording interval $D_{K+1}$, and the EOD signal, is time-sequentially recorded within an interval $E_d$ shown in FIG. 17(C), subsequent to the recording interval $E_c$. The positions of these recording intervals $E_c$ and $E_d$ of these signals are selected in the vicinity of the start of the recording interval $A_{K+1}$ shown in FIG. 17(A).

In the present invention, the digital video signal may be transmitted by the transmission path of one or two channels among the four channels. Moreover, the transmission may be carried out in terms of frames or fields. Accordingly, the transmission time of the picture element data differs according to the transmission mode. When transmitting still picture, the recording must be carried out by taking into account this transmission time of the picture element data corresponding to one picture, so that the transmission of the picture element data corresponding to one picture is completed before the point in time when the still picture is to be displayed on a display device. Thus, the starting point of recording differs according to the above transmission mode.

It is usually difficult to select the starting positions of recording in accordance with the transmission mode to suitable positions in the digital video signal recording system. Hence, picture element data corresponding to substantially one picture may be recorded at a point preceding the point where the digital audio signal is to be reproduced, by a predetermined period, regardless of the transmission mode. For example, the picture element data of the picture element group in the last row (or last column), which corresponds to the picture element data required to complete one picture with the above picture element data corresponding to substantially one picture, and the EOD signal, or the EOD signal alone, may be recorded subsequent to the header signal with a timing matched with that of the picture display. In this case, it becomes possible to specify the timing of the picture display in real time, with respect to the digital audio signal which is recorded and reproduced simultaneously with the picture element data corresponding to one picture.

On the other hand, upon reproduction, the switching of the outputs of the memories 128 and 129 into which the picture element data corresponding to one picture are written, is carried out at a point when the EOD signal is reproduced. Hence, the display timing of the reproduced picture can be selected according to the selection of the recording position of the EOD signal. In the examples shown in FIGS. 17(A) through 17(C), it is possible to display the reproduced picture almost simultaneously as the start of reproduction of the (K+1)-th music program. For example, the picture corresponding to the digital video signal recorded within the recording interval $D_{K+1}$ shown in FIG. 17(C) is displayed at the point when the EOD signal recorded in the recording interval $E_d$ is reproduced. In the case shown in FIG. 17(C), if the picture corresponding to the digital video signal recorded within the recording interval $C_{K+1}$ is to be displayed, this picture will be reproduced prior to the start of reproduction of the digital audio signal recording interval $A_{K+1}$ by a period corresponding to the recording interval $E_d$. However, the transmission period of the recording interval $E_d$ is exceedingly short and is in the range of several tens of words, and for this reason, it will be felt as if the display of the picture and reproduction of the digital audio signal occurred simultaneously.

Synchronizing signal detection signals are periodically obtained from the synchronizing signal detecting circuit 123, and the synchronizing signal detection signals are obtained with a period corresponding to 696 words if the signal format shown in FIG. 4 is employed. However, as clearly seen from FIGS. 17(A) through 17(C), reproduction of the synchronizing signal is interrupted after the picture element data corresponding to substantially one picture are reproduced. Accordingly, at this point in time, the control circuit 124 controls the memory write controller 126 so that the memories 128 and 129 do not carry out write-in operations. That is, the memories 128 and 129 are controlled so as to only carry out write-in of the video signal part reproduced subsequent to the header signal.

All the sixteen bits of data reproduced from unrecorded intervals between adjacent digital video signal recording intervals, where the digital video signal is not recorded, are "0" as in the case of the EOD signal. However, the header signal is not recorded in these unrecorded intervals where the digital video signal is not recorded. Thus, the data reproduced from these unrecorded intervals will not be erroneously detected as the EOD signal, and the write-in operations of the memories 128 and 129 will continue to be stopped by a control circuit and the like. Accordingly, the switching circuit 131 is switched when the EOD signal is reproduced after the header signal is reproduced, so as to read out from the memory 128 or 129 into which the data was written up to that point. Strictly speaking, the switching circuit 131 is switched when the code "B19R" within the header signal shown in FIG. 5 assumes a value different from the value assumed up to that point and when the EOD signal is reproduced. If the EOD signal does not exist, the data reproduced subsequent to the header signal will become written into the memories 128 and 129 as the picture element data of the video signal part.

Next, description will be given with respect to the operation in which only the picture information of a desired category is to be selectively reproduced, in a case where a plurality of picture information of mutually different categories are recorded onto the disc 70. The user first selects a desired category number from various category numbers printed on the label, accommodating case, and the like of the disc 70. Then, a picture category specifying signal corresponding to the selected category number, is applied to the input terminal 127 in FIG. 13. The control circuit 124 repeatedly carries out an operation in which this picture category specifying signal and the picture category identification code "P.G" within the signal obtained from the header signal detecting circuit 125 are compared, and the memory 128 (or 129) is controlled so as to write in the video signal part reproduced subsequent to the reproduced header signal only when the compared signals coincide. Hence, only the picture information of the desired category number is stored into the memory 128 (or 129), and read out from the memory 128 (or 129) to display the picture of the desired category. Because such picture information is displayed in synchronism with the music, the display is instantaneously switched to the display of a subsequent picture information of the same category number similarly stored in the memory 128 (or 129), when the reproduction of music is continued for a certain time period. In this manner, it is possible to continuously display the picture information of only the desired category selected by the user, while reproducing digital audio signal.

A selector (not shown) for applying the above picture category specifying signal to the input terminal 127, is automatically set with a category number having a first priority, when the power source is connected to the digital signal reproducing apparatus. That is, in the case where the digital video signal of the normal picture is reproduced from the fourth channel and the digital video signal in which picture information of a plurality of mutually different categories are time-sequentially multiplexed is successively reproduced from the third channel as described before, and a volatile memory is used in the above selector, the selector is designed to be set automatically so that the picture category specifying signal which specifies the digital video signal in the fourth channel is obtained from the selector when the power is turned on. By designing the selector in this manner, the picture category specifying signal is prevented from assuming a random value when the power is turned on, and moreover, it becomes possible to automatically specify the picture category of the digital video signal in the fourth channel which is considered as being the category most likely to be specified. In addition, if a nonvolatile memory is used in the selector, it is unnecessary to provide a circuit for automatically setting the category number of the first priority when the power is turned on.

Figure 18A:
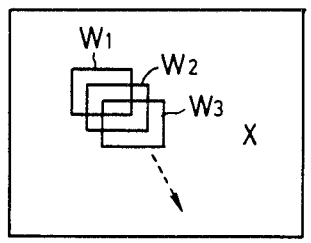
FIGS. 18A and 18B respectively are diagrams for explaining the change in display of the picture to a still picture from a partially moving picture in the reproducing apparatus according to the present invention.
Figure 18B:
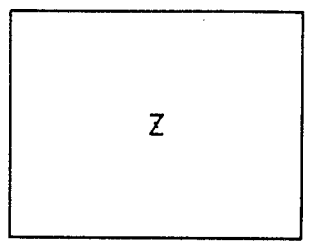

Next, description will be given with respect to the recording and reproducing operations according to the present invention, when changing or switching the full picture in which a moving picture is displayed at a part thereof, to a completely different color still picture. In FIG. 18A, a color still picture X is displayed as background, and a moving picture is displayed within a part thereof. If a part within the color still picture X is moved as indicated by an arrow in FIG. 18A in a sequence W1→ W2→ W3→ . . . , this part within the picture X will appear on the screen as if this part is moving, and the display of the partially moving picture is carried out. A case will now be considered where the full display of such picture X having the moving picture display within a part thereof, is changed to the display of a completely different color still picture Z shown in FIG. 18B.

Generally, the picture element data corresponding to one picture of the color still picture Z are transmitted in a continuous manner, after transmission of the picture element data corresponding to the above partially moving picture is completed. Hence, a method may be considered according to which the movement in the displayed picture is stopped during transmission period of the picture element data corresponding to one picture of the color still picture Z, to change the display to the color still picture Z by detecting the EOD signal transmitted after the above transmission period. However, according to this method, it is only possible to change the display to another color still picture after the movement in the displayed picture is stopped. Thus, this method poses too much limitation from the artistic point of view and in making the video programs.

Accordingly, according to the present invention, the moving picture information is transmitted in accordance with the movement in the displayed picture. Moreover, it is noted that intervals in which transmission does not take place are introduced as the speed of movement in the moving picture becomes slower. Hence, the picture element data corresponding to one picture of the color still picture Z which is to be displayed subsequent to the display of the partially moving picture, according to the header signal at least comprising the synchronizing signals 54a and 54b, the codes "B19W" and "B19R", and the address signals 56a through 59a and 56b through 59b, are divided and recorded onto the recording medium. Therefore, the above described problem is eliminated by reproducing the recording medium recorded in such a manner.

Figure 19:
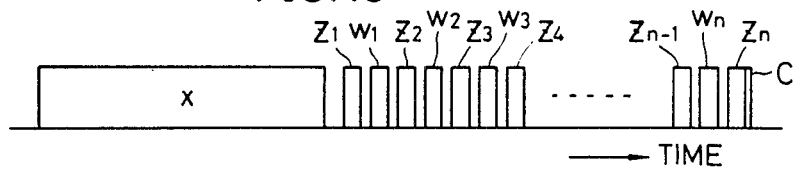
FIG. 19 diagrammatically shows an embodiment of a recording sequence of the digital video signal reproduced by the reproducing apparatus according to the present invention.
Figure 20A:
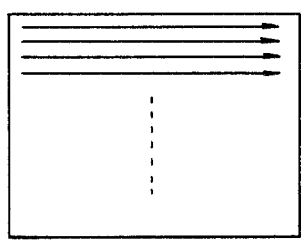
FIGS. 20A and 20B respectively show examples of transmission sequence of picture element data of the digital video signal to be reproduced by the reproducing apparatus according to the present invention.
Figure 20B:
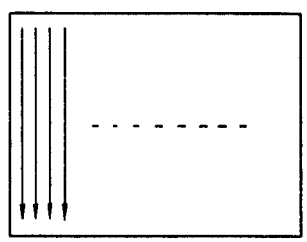

FIG. 19 diagrammatically shows the manner in which the recording is carried out. In FIG. 19, picture element data x corresponding to one picture of the color still picture X shown in FIG. 18A are recorded with the signal format shown in FIG. 4. Then, a first digital video signal comprising the picture element data corresponding to one picture of the color still picture Z which is to be displayed subsequent to the color still picture X and the header signal having the signal format shown in FIG. 5, are divided into n divided signals $z_1$, $z_2$, $z_3$, . . . , $z_n$. These divided signals $z_1$ through $z_n$ are recorded within unrecorded intervals other than recording intervals $w_1$, $w_2$, $w_3$, . . . , $W_n$ of a second digital video signal which comprises the picture element data of the partially moving picture in which a part of the picture moves as indicated by W1, W2, W3, . . . in FIG. 18A and the header signal. That is, the divided signals $z_1$ through $z_n$ are recorded within the unrecorded intervals in which the signals $w_1$ through $w_n$ which are recorded intermittently according to the movement in the partially moving picture do not exist. In FIG. 19, a signal comprising the header signal and the EOD signal is recorded within a recording interval C, and this recording interval C is arranged after the recording interval of the last divided signal $z_n$ among the divided signals constituting one picture of the color still picture Z.

When reproducing the disc 70 which is recorded with the digital video signals as shown in FIG. 19, the picture element data x of the digital video signal corresponding to one picture of the color still picture X are successively written into one of the memories 128 and 129 within the horizontal blanking period. For the sake of convenience, it will be assumed that the write-in is carried out with respect to the memory 128. Then, the read-out with respect to the memory 128 is carried out within the video period, to display the full color still picture X on the screen. Next, the divided signal $z_1$ related to the color still picture Z which is obtained by reproducing the subsequent recording interval, is written into the other non-displaying memory 129 within the horizontal blanking period, while read-out is carried out with respect to the memory 128 within the video period. Further, the picture element data within the digital video signal obtained by reproducing the subsequent recording interval $w_1$, are written at specified addresses in the memory 128 and read out. By this read-out carried out with respect to the memory 128, although the full color still picture X is displayed up to that point, a part of the displayed picture is changed and a picture similar to that displayed up to that point is displayed within the part indicated by W1 within the displayed picture shown in FIG. 18A.

Similarly, the picture element data reproduced from the recording intervals of the divided signals $z_2$, $z_3$, . . . , $z_{n-1}$, $z_n$ are written into the non-displaying memory 129 according to the code "B19W" within the header signal. On the other hand, the picture element data reproduced from the recording intervals $w_2$, $w_3$, . . . , $w_n$ are written at addresses specified by the address signals 56a through 59a and 56b through 59b in the memory 128, according to the code "B19W" within the header signal, and then read out from the memory 128 according to the code "B19R" within the header signal. As a result, a part of the displayed picture moves as indicated by W1, W2, W3, . . . in FIG. 18A, and the partially moving picture is displayed. The movement of a part of the displayed picture in FIG. 18A is continued until the picture element data reproduced from the recording interval of the divided signal $z_n$ are written into the non-displaying memory 129 and the picture element data amounting to one picture are finally written into the non-displaying memory 129. The data read out from the non-displaying memory 129 are selectively produced through the switching circuit 131 when the EOD signal recorded within the last recording interval C is reproduced. Accordingly, the display can be switched and changed to the completely different color still picture display Z from the partially moving picture, without stopping the movement in the partially moving picture.

As may be understood from the description in conjunction with FIG. 15 and the like, when storing n bits in each of the picture element data, $(4+1+1)\times n$ 64k-RAMs may be used to constitute the memories 128 and 129. However, if the resolution of the chrominance signal may be lower than that in the embodiment described, for example, the color difference signals (R−Y) and (B−Y) may be written into the memories 128 and 129 line sequentially. In this case, $(4+1)\times n$ 64k-RAMs, that is, 30 64k-RAMs when n is equal to 6 bits, may be used to constitute the memories 128 and 129.

The capacity of a 256k-RAM is 262,144 ($=2^{18}$) bits. Thus, it would be preferable to use such a 256k-RAM because each bit of the picture element data corresponding to one frame can be written into one such 256k-RAM. In this case, although it depends on the read-out speed of the 256k-RAM, a 2-frame memory circuit may be constituted when the read-out speed is slow in which case two 256k-RAMs are used time-divisionally. Further, because the digital color difference signals are read out from the memories 128 and 129 with a read-out speed which is ¼ that of the digital luminance signal, one RAM may be used time-divisionally with respect to the two kinds of color difference signals.

The dividing unit of the digital video signal recorded onto the disc 70 is not limited to the dividing unit described heretofore. The requirement here is to determine the dividing unit so that the human eye cannot detect that the color and luminance are being changed independently, when the display is gradually changed to a picture while another picture is being displayed. For example, the digital video signal may be divided into units of picture element data corresponding to a number of scanning lines in the range of ten at the maximum, and the digital video signal can be transmitted by adding the header signal to the divided units of picture element data.

In the embodiments described heretofore, description was given by assuming that each of the video signal parts (divided picture element data groups) relate to the picture element data of two mutually adjacent scanning lines as shown in FIG. 5, that is, to two rows of picture element data groups arranged horizontally. However, each of the video signal parts may relate to picture element data of the range of two to ten mutually adjacent columns of picture element data groups arranged vertically.

Figure 21:
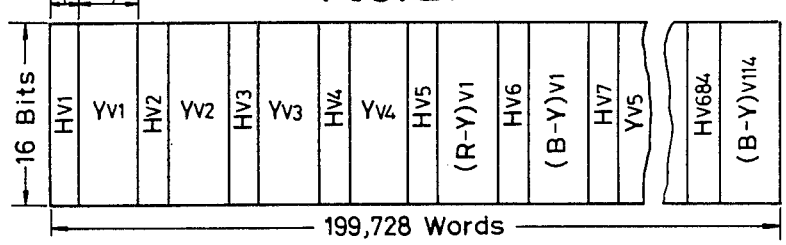
FIG. 21 shows another embodiment of a signal format of the digital video signal reproduced by the reproducing apparatus according to the present invention.
Figure 22:
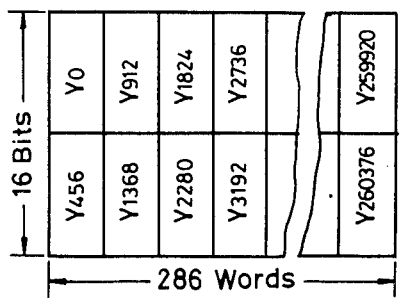
FIG. 22 shows an embodiment of a signal format of one divided picture element data group within the digital video signal shown in FIG. 21.

FIG. 21 shows a signal format of the digital video signal for a case where the digital video signal is divided into two columns of picture element data groups arranged vertically. Because one word consists of sixteen bits and each of the picture element data having the quantization number of eight bits are respectively arranged in the upper and lower eight bits of one word, two picture element data are transmitted by one word. A total of 572 luminance picture element data groups in the first vertical column at the left most part of the screen are indicated by $Y_{V1}$, and each of the picture element data are arranged in sequence from the top of the screen to the bottom of the screen. As shown in FIG. 22, The picture element data $Y_0$ at the uppermost part of the screen is arranged in the upper eight bits of the first word, and the picture element data $Y_{456}$ at the second uppermost part of the screen is arranged in the lower eight bits of the first word. Similarly, the picture element data $Y_{912}$ is arranged in the upper eight bits of the second word, the picture element data $Y_{1368}$ is arranged in the lower eight bits of the second word, the picture element data $Y_{1824}$ is arranged in the upper eight bits of the third word, ..., and the picture element data $Y_{260376}$ at the lowermost part of the screen is arranged in the lower eight bits of the 286-th word. A total of 572 luminance picture element data groups in the second column from the left end of the screen are indicated by $Y_{V2}$, and a total of 572 luminance picture element data groups in the third column from the left end of the screen are indicated b $Y_{V3}$. Similarly, a total of 572 luminance picture element data groups in the i-th (i is an integer from 1 to 456) column from the left end of the screen are indicated by $Y_{Vi}$. Each of the picture element data are arranged similarly as the above picture element data group $Y_{V1}$, and the picture element data corresponding to one vertical column are transmitted by 286 words.

In addition, a total of 572 picture element data groups of the first digital color difference signal arranged in the j-th (j is an integer from 1 to 114) column from the left end of the screen are indicated by $(R-Y)_{Vj}$, and a total of 572 picture element data groups of the second digital color difference signal arranged in the j-th column from the left end of the screen are indicated by $(B-Y)_{Vj}$. Each of the 572 picture element data groups corresponding to one column are arranged in a sequence starting from the top to the bottom of the screen in the upper eight bits of the first word, lower eight bits of the first word, upper eight bits of the second word, lower eight bits of the second word, upper eight bits of the third word, . . . , and lower eight bits of the 286-th word, and the picture element data corresponding to one column are transmitted by 286 words. A header signal having six bits, for example, is added to the beginning of each of the above divided picture element data groups.

Further, as shown in FIG. 21, the above component coded signal has a signal format in which the signal is time-sequentially transmitted in terms of units, where one unit comprises a total of six picture element data groups, that is, four picture element groups $Y_{V(4j-3)}$, $Y_{V(4j-2)}$, $Y_{V(4j-1)}$, and $Y_{V(4j)}$ and the two kinds of digital color difference signals $(R-Y)_{Vj}$ and $(B-Y)_{Vj}$.

When writing the component coded signal having the signal format shown in FIGS. 13 and 14 into the memory circuit shown in FIG. 15, the input switches $S_1$ through $S_6$ are respectively connected to one fixed contact during the transmission interval of 286 words of one picture element data group, and the output address signal of the address signal generating circuit 142 is varied for each transmission interval of one picture element data in terms of "0072" in hexadecimal, for example. During a subsequent transmission interval of 286 words of one picture element data group, the input switches $S_1$ through $S_6$ are switched and connected to another fixed contact, and the address signal is varied similarly. By repeating these operations, it is possible to efficiently store all of the picture element data into the memories $M_{11}$ through $M_{66}$.

In addition, the read-out from the memories $M_{11}$ through $M_{66}$ is the same as in the embodiment described before. That is, the address in incremented by one from the address "0000", and four horizontal picture element data of the digital luminance signal and one horizontal picture element data of the digital color difference signal $(R-Y)$ and one horizontal picture element data of the digital color difference signal $(B-Y)$, are read out simultaneously in parallel from the memories $M_{11}$ through $M_{66}$.

Figure 8:
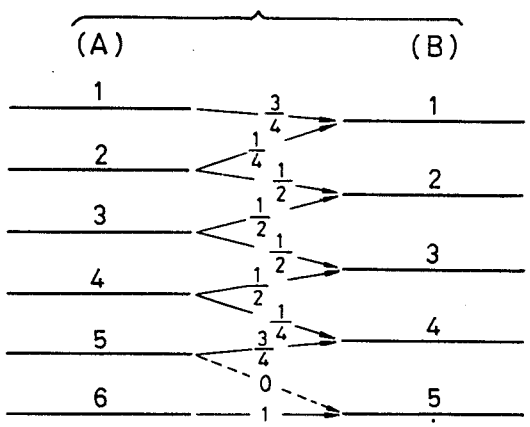
FIGS. 8(A) and 8(B) respectively are diagrams showing an example of a method of converting the number of scanning lines to 525 lines from 625 lines.

Moreover, the digital video signal corresponding to one frame or one field may be transmitted by the two channels Ch-3 and Ch-4 shown in FIG. 8. In this case, the digital video signal is time-sequentially reproduced from the two channels and transmitted by one transmission line.

The number of scanning lines of the digital video signal is 625 in the above described embodiments so that the signal recording format of the digital audio disc such as the disc 70 can be made common throughout the world. By employing such a signal recording format, there will be no lack of information when reproducing the video signal as a video signal in accordance with the PAL system or the SECAM system. However, the digital video signal having 525 scanning lines may be recorded onto the disc 70 instead. In this case, the recording is carried out by selecting the product of the number of sampling points of the luminance signal in one scanning line and the effective number of scanning lines, to a value slightly smaller than $2^{18}$. The effective number of scanning lines in the 525-line system is in the range of 483 ($=525\times0.92$). Hence, if it is assumed that 483 lines among the 525 lines are to be transmitted, the number of sampling points of the digital luminance signal which is to be transmitted in one scanning line is selected to 540 because $2^{18}\div483=542.7$. The allowable range of the horizontal blanking period of the 525-line system is up to 18% of the period corresponding to 1H, and the sampling frequency becomes as follows.

$$15.734\times540/(1-0.18)=10.3 \text{ (MHz)}$$

On the other hand, as sampling frequencies obtained by simple ratios with respect to the sampling frequency of 13.5 MHz described before, a sampling frequency of 10.125 MHz can be obtained by multiplying ¾ to 13.5 MHz and a sampling frequency of 10.8 MHz can be obtained by multiplying 4/5 to 13.5 MHz, for example. Hence, if the sampling frequency is set to 10.125 MHz, the number of sampling points becomes $10,125,000/15,734=643.5$. The above 540 sampling points in one scanning line is 0.839 times the number 643.5, and is 16.1% smaller than 643.5. However, sufficient picture information can be recorded and reproduced by such a number of sampling points, because 16.1% is within the allowable range of 18% with respect to the horizontal blanking period of the 525-line system, that is, the NTSC system.

However, when the digital video signal of the 525-line system is recorded on the disc 70, it will be necessary to provide a converting circuit for converting the number of scanning lines to 625 lines in a reproducing apparatus which reproduces the video signal as a color video signal in accordance with the PAL or SECAM system. In this case, the vertical resolution of the reproduced signal is poor. However, because the sampling frequency is equal to 10.125 MHz and not 9 MHz, the horizontal resolution will be improved by 12.5%. On the other hand, the chrominance subcarrier frequency is equal to 4.25 MHz in the PAL system and 4.25 MHz and 4.406 MHz in the SECAM system, and the frequency components in these bands are attenuated in the television receiver in order to reduce the interference of the carrier chrominance signal with respect to the luminance signal. For this reason, even if the band of the luminance signal is widened by 4.556 MHz calculated from $10.125\times(½)\times0.9$, there is no significant difference compared to the band of the luminance signal of the 625-line system in which the sampling frequency is equal to 9 MHz, because the band of this luminance signal is equal to 4.05 MHz calculated from $9\times(½)\times0.9$ (the value "0.9" in the above calculations is a value which is taken into consideration when considering the attenuation due to a filter used for eliminating the folding noise).

Accordingly, in general, when the memory capacity is set constant, it would be more practical to improve the vertical resolution by 19% ($625/525=1.1905$) than to improve the horizontal resolution (by the 12.5% described before).

In a case where the digital video signal supplied to the memory circuit in the reproducing apparatus according to the present invention is a component coded signal, the signal format of the digital video signal is not limited to the format shown in FIGS. 5 and 14. That is, four horizontal picture element data of the digital luminance signal (or four vertical picture element data groups) and two horizontal picture element data from both the two kinds of digital color difference signals (or two vertical picture element data groups), or the above four horizontal picture element data of the digital luminance signal and one horizontal picture element data of either one of the digital color difference signals (or one vertical picture element data group), may be considered as one unit, and the digital video signal may be transmitted with a format such that these data are time-sequentially multiplexed therein.

The disc from which the digital video signal is reproduced, is not limited to the disc in the embodiments described heretofore. The disc may be an electrostatic capacitance type disc formed with guide grooves, a disc from which the recorded signals are read by a light beam, and the like. Further, when the television receiver comprises input terminals for three primary color signals R, G, and B, a matrix circuit may be used instead of the encoder 135. In this case, the matrix circuit converts the luminance signal Y and the color difference signals (B−Y) and (R−Y) into the three primary color signals R, G, and B and supplies these three primary color signals R, G, and B to the respective input terminals of the television receiver. Hence, it is possible to obtain a still picture of an exceedingly high quality by such a television receiver. In addition, the color difference signals recorded on the disc 70 may of course be a combination of color difference signals (G−Y) and (R−Y) (or (B−Y)), I and Q signals, or the three primary color signals.

Further, the present invention is not limited to these embodiments, but various variations and modifications may be made without departing from the scope of the present invention.

What is claimed is:

1. A digital video signal reproducing apparatus comprising:
    reproducing means for reproducing a digital video signal from a recording medium, said recording medium being time-sequentially recorded with said digital video signal having a signal format in which a header signal is added to each of divided picture element data groups which are obtained by dividing a picture element data group in terms of a predetermined unit, said picture element data group being obtained by a digital pulse modulation of an analog video signal at a sampling frequency such that a product of a number of picture element data in one scanning line and a number of active scanning lines per frame in one picture of a standard television system is greater than $2^{17}$ but less than $2^{18}$ and closer to $2^{18}$, said header signal at least comprising a synchronizing signal and a picture mode identification code;
    a header signal reproducing circuit for detecting said header signal within the digital video signal reproduced by said reproducing means and for reproducing said header signal;

two memory circuits into which said picture element data group within said reproduced digital video signal is written, and from which a stored picture element data group is read out;

memory control means for selecting a write-in format with which said picture element data group is written into said memory circuits according to a value of said picture mode identification code of the header signal detected by said header signal reproducing circuit and for writing in said picture element data group into said memory circuits with the selected write-in format, and for reading out the stored picture element data group from one of said two memory circuits;

a digital-to-analog converting circuit for subjecting said picture element data group from said memory circuits to a digital-to-analog conversion and for obtaining said analog video signal; and a circuit supplied with an output signal of said digital-to-analog converting circuit for producing an analog video signal in conformance with a standard television system.

2. A digital video signal reproducing apparatus as claimed in claim 1 in which said two memory circuits respectively comprise a memory element group in which N stages of memory elements each having a memory capacity in a range of $2^{16}$ bits to $2^{18}$ bits are arranged, where N is a natural number, input switch means for supplying each bit in upper N bits of a picture element data within one divided picture element data group to said memory elements in each stage constituting said N-stage memory element group in parallel, and an address signal generating circuit for generating an address signal and commonly applying the generated address signal to each of said memory elements in said N-stage memory element group, each of upper N bits of said picture element data corresponding to one field of said digital video signal being written into said N-stage memory element group.

3. A digital video signal reproducing apparatus as claimed in claim 1 in which said analog video signal is a luminance signal.

4. A digital video signal reproducing apparatus as claimed in claim 1 in which said reproducing means reproduces the digital video signal at least together with an error detection signal, an error correction signal, and a synchronizing signal from said recording medium, said digital video signal which is corrected and restored by said error correcting signal being supplied to said memory circuits.

5. A digital video signal reproducing apparatus as claimed in claim 1 in which said header signal further comprises a picture category identification code for identifying one category of picture information from among a plurality of mutually different categories of picture information, and said memory control means operates so that when a value of said picture category identification code reproduced by said signal reproducing circuit coincides with a value of an externally applied picture category identification signal indicating a predetermined category, said divided picture elemen. data groups reproduced in continuance with said header signal comprising said picture category identification code which has the value coinciding with the value of said externally applied picture category identification signal are written into one of said two memory circuits.

6. A digital video signal reproducing apparatus as claimed in claim 1 in which said recording medium is recorded with a read-out instruction code and a signal transmission termination signal with a timing matched with a picture display of said digital video signal and continuance with the digital video signal comprising the picture element data group corresponding to one picture, and said memory control means comprises first memory control means for performing a read-out from said memory circuit which is written in with the picture element data group corresponding to said one picture when said read-out instruction code detected by said header signal reproducing circuit is reproduced, and switching means for selectively producing a read-out output of said one memory circuit stored with said digital video signal which is added with said signal transmission termination signal with a timing in accordance with a reproduced timing of said signal transmission termination signal.

7. A digital video signal reproducing apparatus as claimed in claim: 6 in which said first memory control means interrupts a write-in of said header signal or said signal transmission termination signal upon reproduction of said header signal or said signal transmission termination signal.

8. A digital video signal reproducing apparatus as claimed in claim 1 in which said header signal further comprises a write-in specifying code for specifying which memory circuit within the reproducing apparatus is to be written in with said divided picture element data groups out of a displaying memory circuit reading out picture element data which are being displayed and a non-displaying memory circuit writing in picture element data which are not being displayed, and said memory control means performs a write-in of said divided picture element data groups which are reproduced in continuance with the header signal comprising said write-in specifying code into said displaying memory circuit or said non-displaying memory circuit according to a value of said write-in specifying code detected by said header signal reproducing circuit and a read-out of picture element data from said displaying memory circuit.

9. A digital video signal reproducing apparatus as claimed in claim 1 in which said header signal further comprises a picture transmission identification code which identifies whether said picture element data group corresponds to one picture, and said memory control means comprises first means for producing a synchronizing signal detection signal even when said synchronizing signal is not detected, with a period with which the synchronizing signal detection signal should originally be produced, when said header signal reproducing circuit detects said picture transmission identification code as identifying that said picture element data group correspondings to one picture, and second means for performing a write-in of said divided picture element data groups reproduced in continuance with said synchronizing signal detection signal into one of said memory circuits according to said synchronizing signal detection signal and a read-out of the written in picture element data from said one displaying memory circuits.

10. A digital video signal reproducing apparatus as claimed in claim 9 in which said second means comprises means for writing said divided picture element data groups into one of said memory circuits when said picture transmission identification code is not detected, according to a value of a picture transmission identification code detected immediately prior to a point when said picture transmission code is not detected.

11. A digital video signal reproducing apparatus as claimed in claim 1 in which said address signal further comprises an address signal for indicating an address in the memory circuit where said divided picture element data groups are to be written in, and said memory control means performs a write-in of said divided picture element data groups reproduced in continuance with said header signal comprising said address signal into one of said memory circuits according to a value of said address signal detected by said header signal reproducing circuit and a successive read-out of the written in divided picture element data groups from said one memory circuit.

12. A digital video signal reproducing apparatus as claimed in claim 1 in which said header signal reproducing circuit stops its operation to detect the synchronizing signal immediately after said synchronizing signal within said header signal is detected, with respect to an input reproduced signal having a transmission interval corresponding to a specific number of words.

13. A digital video signal reproducing apparatus as claimed in claim 1 in which:
said digital video signal reproduced from said recording medium by said reproducing means is a component coded digital video signal;
said picture element data group comprises first, second, and third picture element data groups, said first picture element data group being obtained by a digital pulse modulation of a luminance signal at said sampling frequency, said second and third picture element data groups being respectively obtained by independent digital pulse modulations of two kinds of color difference signals at another sampling frequency which is 1/L times said sampling frequency, where L is a natural number greater than or equal to two;
each of said divided picture element data groups comprise a total of eight to five horizontal picture element data or vertical picture element data groups;
said component coded digital video siganl has a signal format in which said header signal is added to each of units constituted by the total of eight to five horizontal picture element data or vertical picture element data groups;
said total of eight to five horizontal picture element data or vertical picture element data groups are constituted by four horizontal picture element data or vertical picture element data groups in said first picture element data group, and two horizontal picture element data or vertical picture element data groups from each of said second and third picture element data groups, or one horizontal picture element data or vertical picture element data group from each of said second and third picture element data groups, or one horizontal picture element data or vertical picture element group from at least one of said second and third picture element data groups;
said two memory circuits respectively comprise a first memory element group in which N stages of memory elements each having a memory capacity in a range of $2^{16}$ bits to $2^{18}$ bits are arranged, where N is a natural number, a second memory element group in which N or less stages of memory elements each having at least a memory capacity in a range of $2^{K-1}$ bits to $2^{K+1}$ bits are arranged, where K is equal to 16, 15, or 14, input switch means for supplying each bit in upper N or less bits of the picture element data to said memory elements in each stage constituting said first and second memory element groups in parallel, and an address signal generating circuit for generating an address signal and commonly applying the generated address signal to each of said memory elements in said first and second memory element groups; and
said memory control means comprises write-in means for writing each upper N bits of said first picture element data group corresponding to one field into said first memory element group by repeating a write-in operation in which each upper N bits of four mutually adjacent picture element data in the same scanning line among said first picture element data group are written into the same address of said memory elements constituting said first memory element group, and for writing each upper N or less bits of said second picture element data group and/or said third picture element data group corresponding to one field into said second memory element group by repeating a write-in operation in which each upper N or less bits of four to one picture element data among said second picture element data group and/or said third picture element data group, which are transmitted in terms of the same unit as the picture element data in said first picture element data group, are written into the same address as the picture element data in said first picture element data group which are transmitted in terms of said same unit, and read-out means for reading out the picture element data correpponding to one field by repeating a read-out operation in which eight to five picture element data which are stored at the same address, among the picture element data corresponding to one field which are written in to said first and second memory element groups, are simultaneously read out from the memory elements constituting said first and second memory element groups.

14. A digital video signal reproducing apparatus as claimed in claim 13 in which said address signal generating circuit generates an address signal increasing in value by a predetermined value for every transmission unit of said first picture element data group and said second picture element data group and/or said third picture element data group in said component coded digital video signal.

15. A digital video signal reproducing apparatus as claimed in claim 13 in which said first memory element group comprises 4N random access memories with N random access memories arranged horizontally and 4 random access memories arranged vertically, said second memory element group comprises 2N random access memories with N random access memories arranged horizontally and 2 random access memories arranged vertically, and said input switch means comprises N switches arranged horizontally with 6 contacts through which the picture element data are selectively supplied to a total of 6 random access memories arranged vertically and constituting said first and second memory element groups.

16. A digital video signal reproducing apparatus as claimed in claim 13 in which an unused memory space in said first and second memory element groups which is not used for storing said first through third picture element data groups, is used as a supplementary memory for use with a circuit which converts the number of scanning lines.

* * * * *